United States Patent
Ou et al.

(10) Patent No.: US 10,237,906 B2
(45) Date of Patent: Mar. 19, 2019

(54) METHOD AND APPARATUS FOR IMPROVING UPLINK TRANSMISSION IN A WIRELESS COMMUNICATION SYSTEM

(71) Applicant: ASUSTeK Computer Inc., Taipei (TW)

(72) Inventors: Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/491,374

(22) Filed: Apr. 19, 2017

(65) Prior Publication Data
US 2017/0318615 A1 Nov. 2, 2017

Related U.S. Application Data

(60) Provisional application No. 62/328,288, filed on Apr. 27, 2016, provisional application No. 62/328,301, filed on Apr. 27, 2016.

(51) Int. Cl.
| | |
|---|---|
| *H04W 72/04* | (2009.01) |
| *H04W 76/14* | (2018.01) |
| *H04W 8/00* | (2009.01) |
| *H04B 7/026* | (2017.01) |
| *H04W 88/04* | (2009.01) |

(52) U.S. Cl.
CPC ............ *H04W 76/14* (2018.02); *H04B 7/026* (2013.01); *H04W 8/005* (2013.01); *H04W 88/04* (2013.01)

(58) Field of Classification Search
CPC ... H04W 76/14; H04W 8/005; H04W 76/023; H04W 88/04; H04B 7/026
See application file for complete search history.

(56) References Cited

U.S. PATENT DOCUMENTS

| | | | |
|---|---|---|---|
| 8,781,419 B2 | 7/2014 | Park | |
| 2008/0032630 A1* | 2/2008 | Kim | ..................... H04L 25/0224 455/45 |
| 2012/0039182 A1* | 2/2012 | Zhou | ..................... H04L 1/1893 370/241 |

(Continued)

FOREIGN PATENT DOCUMENTS

| | | | |
|---|---|---|---|
| EP | 2562940 | 2/2013 | |
| EP | 2562940 A2 * | 2/2013 | ............. H04B 7/026 |
| WO | 2016155989 | 10/2016 | |

OTHER PUBLICATIONS

European Search Report from corresponding EP Patent Application No. 17167103.5, dated Sep. 22, 2017.

*Primary Examiner* — Lan-Houng Truong
(74) *Attorney, Agent, or Firm* — Blue Capital Law Firm, P.C.

(57) ABSTRACT

Methods and apparatuses for improving uplink transmissions in a wireless communication system are disclosed herein. In one method, a user equipment receives an indication indicating a type of data that can be transmitted using a cooperation mode. A first data is transmitted using the cooperation mode, in which the first data belongs to the type of data using the cooperation mode based on the indication. A second data is transmitted without using the cooperation mode, in which the second data does not belong to the type of data using the cooperation mode based on the indication. The cooperation mode is enabled when transmitting the first and second data.

16 Claims, 16 Drawing Sheets

(56) References Cited

U.S. PATENT DOCUMENTS

| | | | |
|---|---|---|---|
| 2013/0235754 A1* | 9/2013 | Lim | H04W 72/042 |
| | | | 370/252 |
| 2013/0273923 A1 | 10/2013 | Li | |
| 2014/0171094 A1* | 6/2014 | Noh | H04W 40/22 |
| | | | 455/452.1 |
| 2015/0230224 A1 | 8/2015 | Maaref | |
| 2016/0095128 A1* | 3/2016 | Cao | H04W 88/04 |
| | | | 370/329 |
| 2017/0279727 A1* | 9/2017 | Kodali | H04L 47/2416 |

\* cited by examiner

METHOD AND APPARATUS FOR IMPROVING UPLINK TRANSMISSION IN A WIRELESS COMMUNICATION SYSTEM

CROSS-REFERENCE TO RELATED APPLICATIONS

The present application claims the benefit of U.S. Provisional Patent Application Ser. No. 62/328,288 filed on Apr. 27, 2016 and U.S. Provisional Patent Application Ser. No. 62/328,301 filed on Apr. 27, 2016, the entire disclosures of which are incorporated herein in their entirety by reference.

FIELD

This disclosure generally relates to wireless communication networks, and more particularly, to a method and apparatus for improving uplink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for improving uplink transmissions in a wireless communication system are disclosed herein. In one method, a user equipment receives an indication indicating a type of data that can be transmitted using a cooperation mode. A first data is transmitted using the cooperation mode, in which the first data belongs to the type of data using the cooperation mode based on the indication. A second data is transmitted without using the cooperation mode, in which the second data does not belong to the type of data using the cooperation mode based on the indication. The cooperation mode is enabled when transmitting the first and second data.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TS 36.331 V12.6.0, "E-UTRA RRC protocol specification (Release 12)" and TS 36.300 V12.5.0, "E-UTRA and E-UTRAN Overall description." Additionally, the exemplary wireless communication systems devices described below may be designed to support one or more standards such as the standard offered by a consortium named "Mobile and wireless communication Enablers for Twenty-twenty (2020) Information Society" referred herein as to METIS, including: D3.2 "First performance results for multi-node/multi-antenna transmission technologies," D3.3 "Final performance results and consolidated view on the most promising multi-node/multi-antenna transmission technologies," D6.6 "Final report on the METIS system concept and technology roadmap," and D8.4 "METIS final project report." The standards and documents listed above are hereby expressly incorporated by reference in their entirety. Furthermore, the following article, Uplink Enhancement of Vehicular Users by Using D2D Communications, in Proc. IEEE Globecom workshop, 2013 (hereinafter referred to as the "Globecom article"), is hereby expressly incorporated by reference in its entirety.

Figure 1:
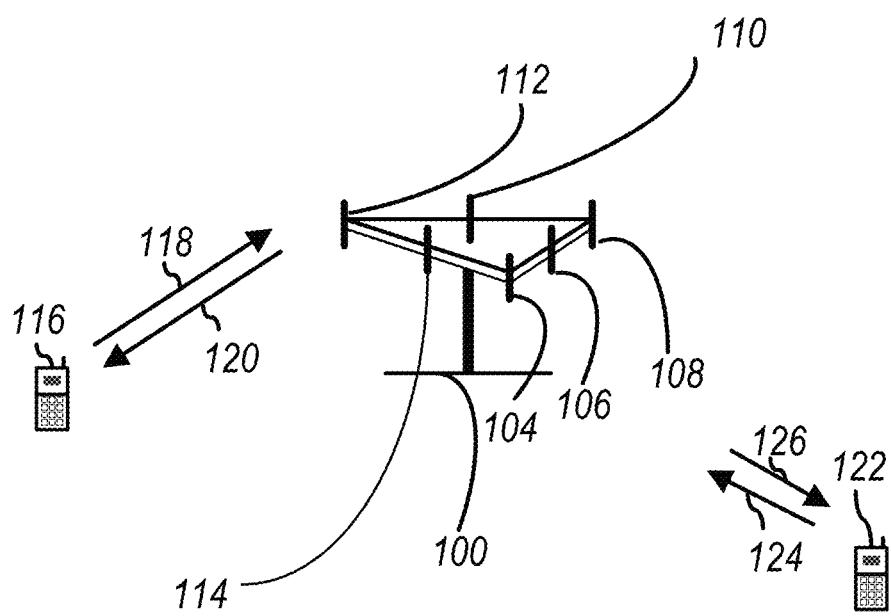
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
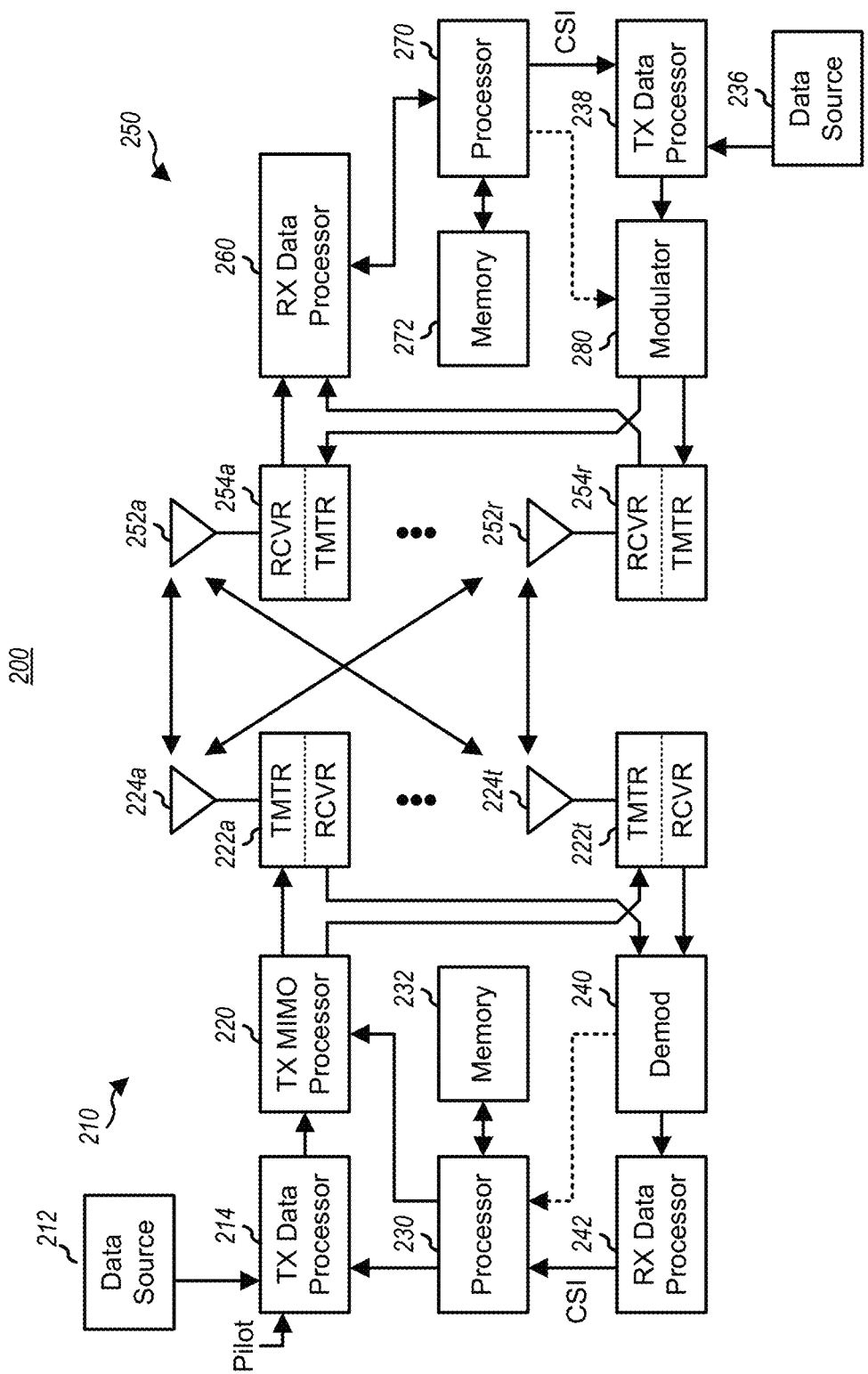
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
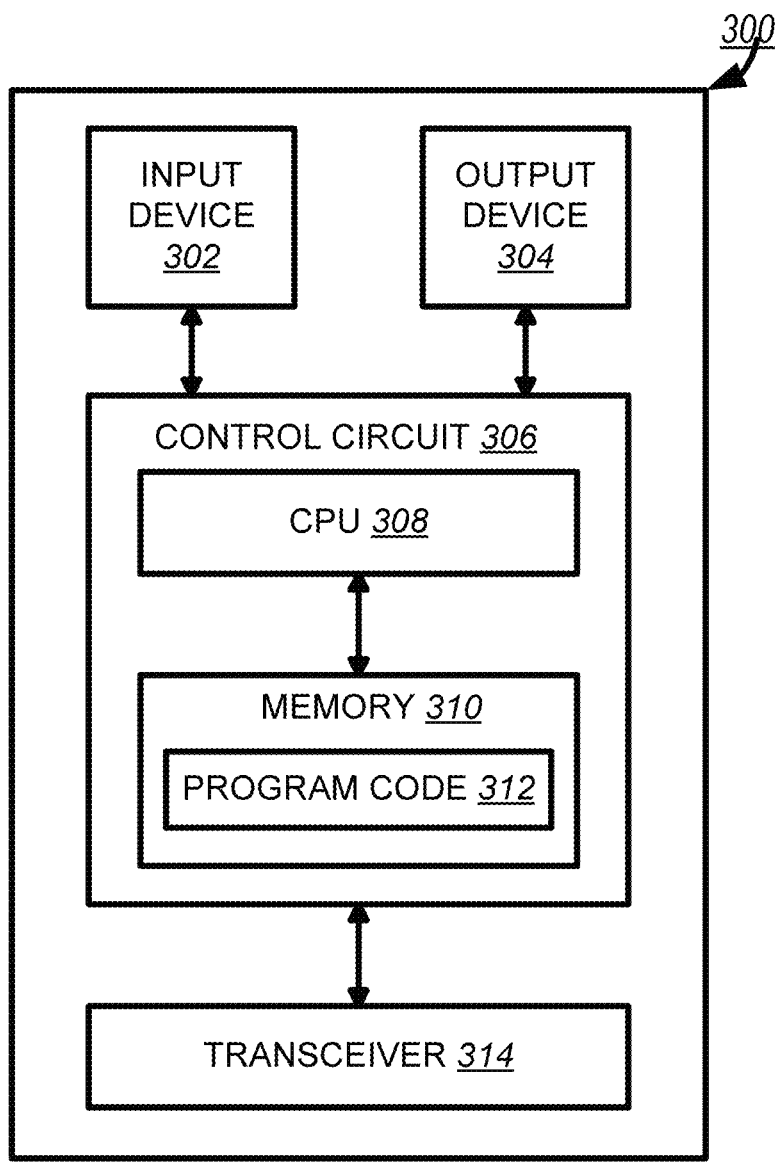
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
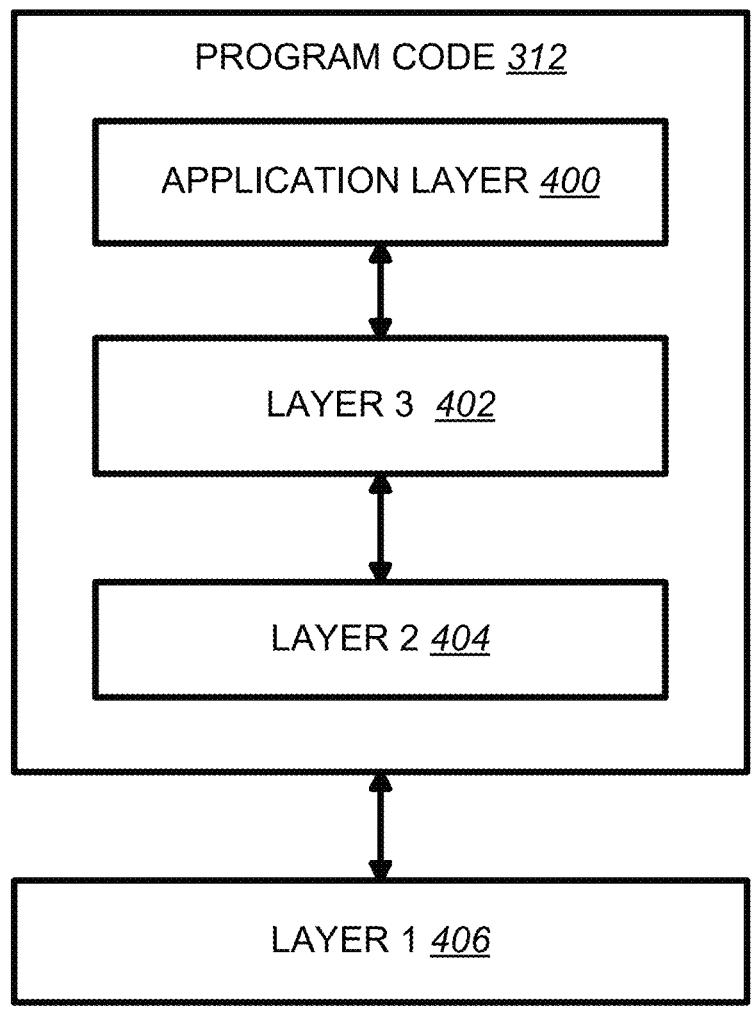
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

A user equipment (UE) located inside a vehicle can be called a vehicle user equipment (VUE). Public transportation vehicles, such as buses or trains, are likely to become hotspots for wireless communication to serve plenty of VUEs. It can be expected that up to 50 active VUE devices per bus and up to 300 active VUE devices per train beyond the year of 2020.

In one scenario, there are several VUEs inside a public transportation vehicle. Some of the VUEs are active and need to send data to the base station (BS). A significant problem faced by VUE devices is the vehicular penetration loss (VPL), which substantially attenuates the radio signals traveling between the VUE devices inside vehicles and the BS. Measurements show that VPL can be as high as 25 dB in a minivan at the frequency of 2.4 GHz, and more than 30 dB VPL is expected for well-isolated, high speed trains. Higher VPLs are foreseeable if higher frequency bands are used (e.g., the 3.6 GHz band allocated to next generation mobile communication systems).

In those instances of high VPL, the performance of uplink transmissions will degrade greatly, especially when VUEs are moving away from the BS. This result is due to VUEs being power limited for uplink transmissions. That is, VUEs cannot increase transmission power for compensating the uplink performance once the maximum power has been reached. Therefore, uplink enhancement is beneficial when the VPL is high.

A mechanism of uplink enhancement by Device to Device (D2D) communication is introduced in the Globecom article, METIS D3.2, and METIS D3.3. It is assumed that several VUE devices can exchange their uplink data by using D2D communications. Also, the VUE devices can collaborate with each other and steer the transmit signal towards the BS when the channel state information (CSI) is available at those VUE devices. In this way, the received signal-to-noise ratio (SNR) at the BS can be significantly improved.

Figure 5:
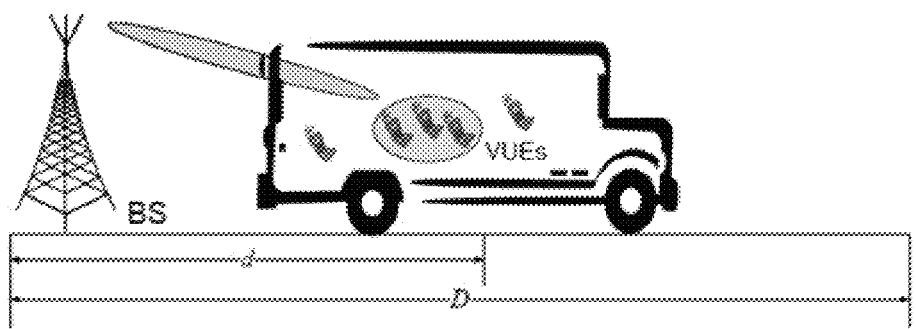
FIG. 5 illustrates cooperative uplink communication of vehicle user equipment (VUE).

As shown in FIG. 5, the cooperative communications take place in two steps: (1) each VUE exchanges its data with all other VUEs by using D2D communication; and (2) the VUEs cooperate to send the data to the BS. A single data stream is transmitted by all the VUEs that participate in the cooperative communication.

The following are the assumptions considered in the Globecom article, METIS D3.2, and METIS D3.3:
 A noise limited system with frequency flat fading, where a BS has a fixed coverage of D meters.
 It can be extended to wideband systems with frequency-selective fading through OFDMA.
 There are m out of n VUEs that are active and need to send data to the BS.
 All active VUEs are transmitting at their maximum power to communicate with the BS.
 A maximum distance of 5 meters between the two furthest VUEs participants.
 1 PRB is used for VUE-to-BS communication.
 10 PRBs are allocated for D2D communication.

The evaluation shows the energy performance of the mechanism by using system level evaluation. The employed evaluation parameters can be found in the Globecom article and METIS D3.2. It is noted that only VUEs which require uplink communications are assumed to participate in the cooperation. Each of the VUEs could communicate with the BS directly (baseline case), or different number of VUEs can cooperate with each other by using D2D communications.

Some points could be observed based on the performance evaluation of the cooperative communications in the Globecom article:
 The more VUEs participate in the cooperation, the lower the energy spent on the communication.
 When VPL is 20 dB, the individual direct communication of each VUE with the BS costs less energy than the cooperating transmission. This is because the energy saved by the VUE cooperation is less than the energy overhead introduced by the D2D communication.
 When VPL is 30 dB, the energy saving of using VUE cooperation can be observed as the vehicle is moving away (more than 500 meters) from the BS. This is due to that VUEs are power limited for uplink communications.
 When VPL is 30 dB, for cooperation between 2 VUEs, at most 35% energy saving can be observed.
 When VPL is 30 dB, for operation involving 8 VUEs, at the cell edge, up to 70% energy saving can be observed.
 When the VPL is high, the communications are conducted in a power limited region, and therefore even if two VUEs cooperate, it results in significant increasing of data rate.

Cooperation between VUEs by means of D2D communication can improve link performance in uplink direction. Gains in terms of energy efficiency for vehicular scenarios are expected with high penetration losses.

When the VPL is moderate, each VUE prefers individual uplink communication with the BS, as the overhead of D2D communications may be big. However, when a vehicle is far away from the BS and the communication is affected by high VPL, the expended energy for each VUE cooperating with other VUEs is lower than the direct VUE-to-BS communications. This can be beneficial, especially for the VUEs that have limited battery lives.

The delays caused by D2D communication could potentially make this scheme not applicable for delay sensitive data traffic.

The mechanism may also apply to outdoor-to-indoor scenario where an indoor UE may experience high penetration loss.

The following terminology may be used hereafter:
 Individual mode: An uplink transmission using individual mode is transmitted by one UE at the same time.
 Cooperation mode: An uplink transmission using cooperation mode is transmitted by multiple UEs at the same time.
 Cooperative data: The data to be transmitted by cooperation mode.
 Originating UE: An UE generating cooperative data for the cooperation of an uplink transmission.

Cooperative UE: An UE receiving cooperative data for the cooperation of an uplink transmission.

The following assumptions may be used hereafter:

Mode of uplink transmissions may be decided by a BS, e.g. based on measurement performed by the BS or assistance information provided by UE.

Cooperation mode may be enabled when it is beneficial and feasible.

Resources for each uplink transmission (regardless of which mode is used) may be controlled by BS.

Uplink transmissions from an UE may be performed in individual mode (i.e. direct uplink transmission) or cooperation mode (i.e. uplink transmission cooperated by D2D communication).

UE may need to indicate the support of cooperation mode to BS.

All UEs involved in the same cooperation mode transmission may be in connected mode and connect to the same serving cell. The UEs not in connected mode or not connect to the same serving cell may not be involved in the same cooperation mode transmission.

Individual mode transmission may be used by default when a UE enters connected mode.

Data from different UE may not be multiplexed in a single uplink transmission.

Figure 6:
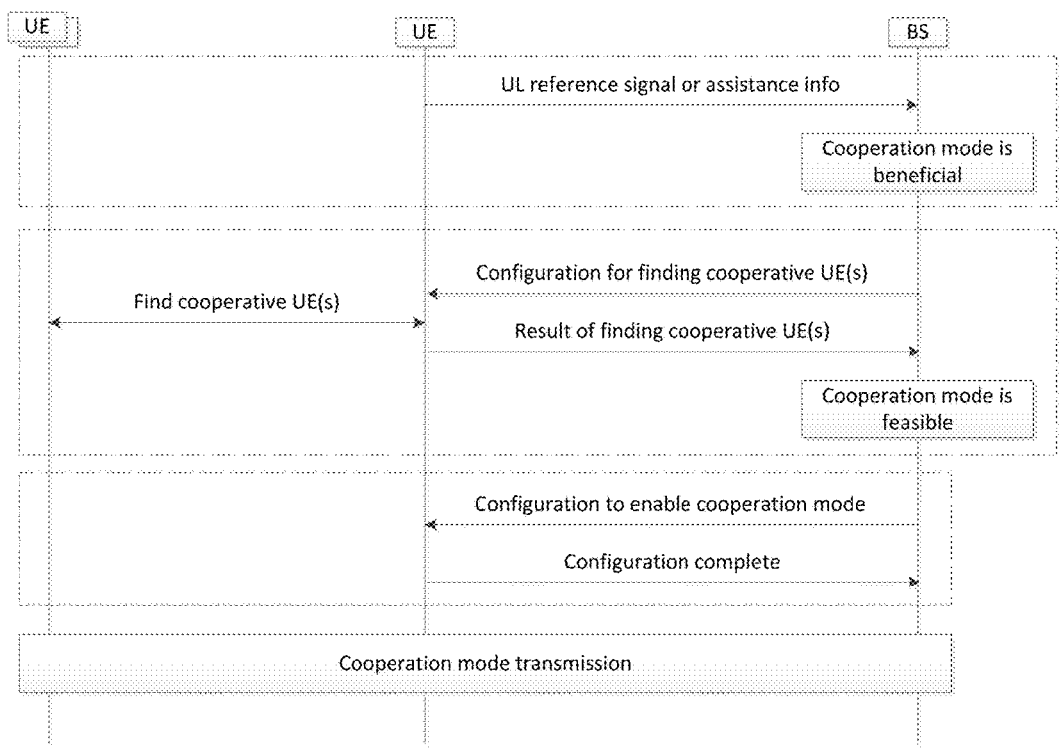
FIG. 6 illustrates one embodiment for enabling a cooperation mode.

To achieve cooperation mode transmission, the following three cases needs to be considered:

Case 1: enabling cooperation mode
Case 2: performing cooperation mode transmission
Case 3: disabling cooperation mode Regarding case 1, when cooperation mode is considered beneficial and feasible (e.g., when a UE gets on a vehicle or distance between the UE in the vehicle and a BS is increased), the BS may configure the UE to enable cooperation mode. The UE may start to use cooperation mode for transmission based on network configuration. FIG. 6 illustrates an example of enabling a cooperation mode. One or more of the following actions may be performed when enabling the cooperation mode:

Evaluate uplink condition of a UE
A BS may keep evaluating uplink condition of the UE to determine whether the UE using cooperation mode is beneficial. The BS may take assistance information provided by the UE into account.

Check feasibility of cooperation mode
A BS may check whether a UE is feasible to use cooperation mode based on whether the UE can find any cooperative UE for cooperation mode.

The BS may send a configuration for the UE to search qualified cooperative UE(s) for cooperation mode. And the UE may indicate to the BS about whether any cooperative UE for cooperation mode can be found.

Enable cooperation mode
If a BS determines that a UE is beneficial to use cooperation mode (and it may be confirmed by the UE that cooperation mode is feasible), the BS provides necessary configuration to the UE to enable cooperation mode. The cooperation mode may apply to all or some transmissions. Confirmation for successful reception of the configuration may be required.

Cooperation mode transmission
The UE can start to use cooperation mode for uplink transmission.

Regarding case 2, after cooperation mode is enabled, a UE can start using cooperation mode for uplink transmission. When the UE has data available for cooperation mode transmission, the UE may be an originating UE or a cooperative UE. For the originating UE, the UE may need to acquire uplink resource and/or D2D resource for the cooperation of an uplink transmission. For the cooperative UE, the UE can receive cooperative data from the originating UE via D2D transmission, and the UE can transmit the received cooperative data to a BS via uplink.

Figure 7:
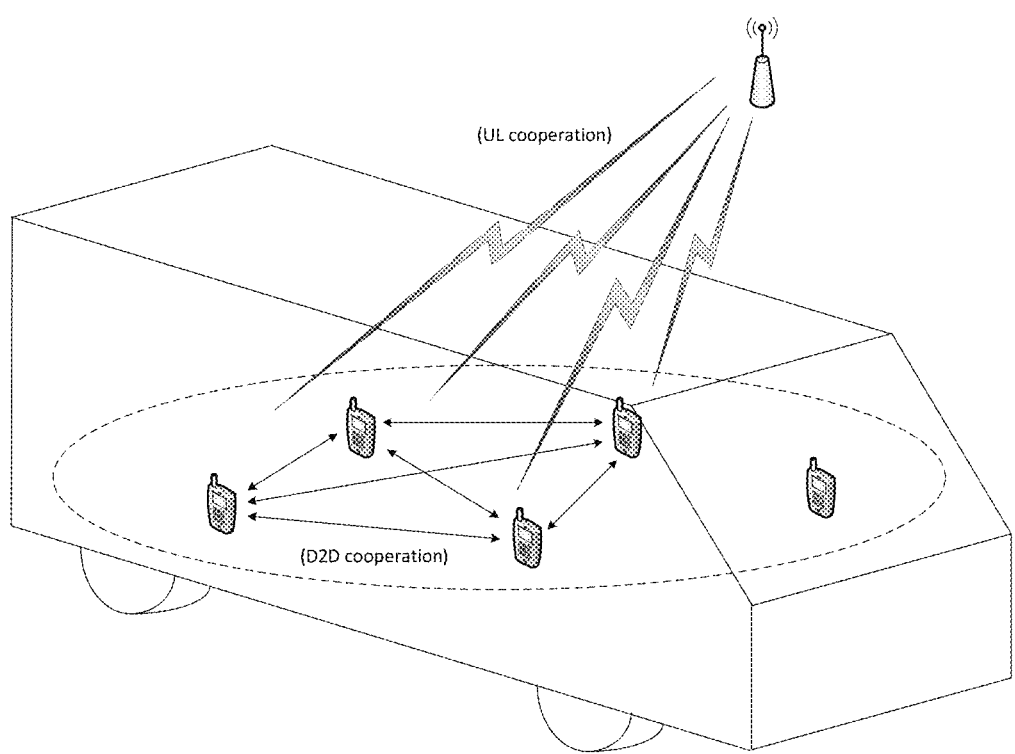
FIG. 7 illustrates one embodiment for performing cooperation mode transmission.

To achieve a cooperation mode transmission, the originating UE and cooperative UEs need to perform D2D cooperation and UL cooperation. FIG. 7 illustrates an example for performing cooperation mode transmission. One or more of the following actions may be performed during cooperation mode transmissions:

Acquisition of uplink resource
When an originating UE has data available for cooperation mode transmission, a UE may acquire uplink resource for the cooperation.

Acquisition of D2D resource
The originating UE can construct a cooperative data based on the acquired uplink resource, and the originating UE can distribute the cooperative data to its cooperative UE(s) via D2D transmission.

The originating UE can acquire D2D resource for the D2D transmission. The cooperative UE(s) can monitor the D2D transmission to receive the cooperative data.

D2D cooperation
An originating UE may need to ensure that at least one cooperative UE is available. Before the cooperative data is transmitted in uplink, it may be transmitted to cooperative UE(s) via D2D transmission first.

The cooperative UE(s) may monitor and receive cooperative data from the originating UE via D2D transmission.

The cooperative UE(s) may change from time to time, e.g., other UE with data becoming available for cooperation mode transmission, with buffer becoming empty, the UE getting on a vehicle, or getting off a vehicle.

UL cooperation
The originating UE and cooperative UE(s) may use the same time-frequency resource to transmit the same cooperative data to a BS.

Figure 8:
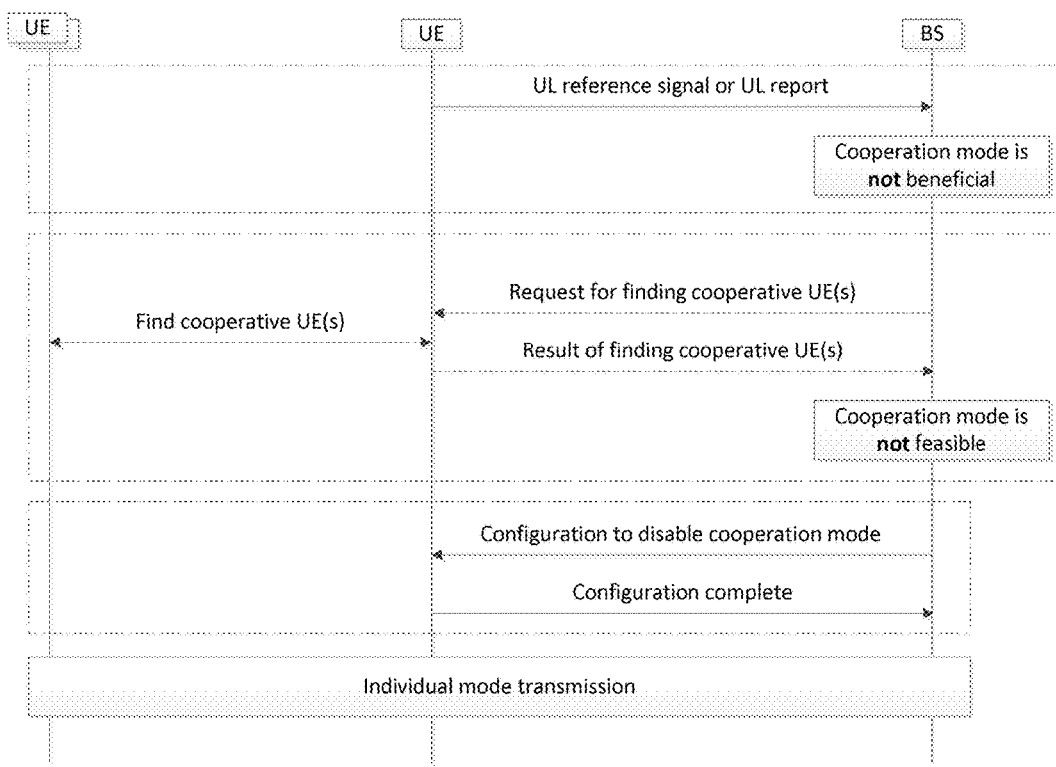
FIG. 8 illustrates one embodiment for disabling cooperation mode.

Regarding case 3, when cooperation mode is considered not beneficial or not feasible, e.g. when a UE gets off a vehicle or distance between the UE in the vehicle and a BS is decreased, the BS may configure the UE to disable cooperation mode. The UE may stop using cooperation mode for transmission and use individual mode based on network configuration. FIG. 8 illustrates an example for disabling cooperation mode. One or more of the following actions may be performed when disabling the cooperation mode:

Evaluate uplink condition of a UE
A BS may keep evaluating uplink condition of the UE to determine whether the UE using cooperation mode is beneficial. The BS may take assistance information provided by the UE into account.

Check feasibility of cooperation mode
A BS may check whether a UE is feasible to keep using cooperation mode based on whether the UE can find any cooperative UE for cooperation mode.

Disable cooperation mode
If a BS determines that a UE using cooperation mode is not beneficial or not feasible anymore, the BS may inform the UE to disable cooperation mode. Confirmation for successful reception of the configuration may be required.

Individual mode transmission
Evaluation of whether cooperation mode is beneficial may still continue, and cooperation mode of the UE may be enabled again that is similar to the case 1.

Cooperation mode transmission may bring gains in terms of energy efficiency under some conditions such as high penetration loss, enough number of cooperative UEs, far away from a BS. It may not bring gains compared to individual mode transmission under some other conditions. In order to select a suitable mode to be used by a UE, evaluation of whether cooperation mode is beneficial or not may be required.

The evaluation may be performed continuously when the UE is using individual mode or cooperation mode. It is assumed that the mode of uplink transmission (individual mode/cooperation mode) may be decided by a BS. Evaluation of whether cooperation mode is beneficial can be used by the BS to determine whether to enable or disable cooperation mode. Besides of measurement performed by the BS, assistance information provided by the UE may also be beneficial for evaluation. The UE may provide assistance information such as Power Headroom Report (PHR) and/or Channel State Information (CSI) to the BS in order to facilitate the evaluation.

Cooperation mode transmission requires an originating UE and cooperative UE(s) to perform uplink transmission cooperatively. Before the originating UE uses cooperation mode for transmission, the UE may need to ensure that at least one qualified cooperative UE is available. A mechanism to find at least one qualified cooperative UE for the cooperation should be considered.

The criteria for an UE to be a qualified cooperative UE may include one or more of the following:
  Channel condition between originating UE and cooperative UE
  The D2D channel condition should be good enough, e.g. an originating UE and a cooperative UE are in the same coach, so that D2D transmission doesn't waste too much power. In addition, it would be better that the D2D channel condition is stable so that the validity of the cooperative UE could be stable.
  Channel condition between a BS and a cooperative UE
  The uplink channel condition should not be too good otherwise individual mode transmission is more suitable. It should not be too bad either so that uplink transmission by the cooperative UE could have some gain.
  Buffer status of data available for cooperation mode transmission of a cooperative UE
  The cooperative UE should have some data available for cooperation mode transmission which tends to be transmitted by cooperation mode.
  Data available for cooperation mode transmission may refer to data with specific QoS requirement or delay constraint, e.g. data that is not delay-sensitive. What kind of data is data for cooperation mode transmission may depend on network configuration, e.g. based on radio bearer.
  Connectivity status of a cooperative UE
  The cooperative UE may need to be in connected mode and may connect to the same serving cell as that connected by an originating UE. The UE not in connected mode or not connect to the same serving cell as that connected by the originating UE may not be a qualified cooperative UE.
  Capability and user consent, of a cooperative UE
  The cooperative UE may need to have the capability of cooperation mode transmission, and may agree to use cooperation mode transmission.

It is assumed that the mode of uplink transmission (individual mode/cooperation mode) may be decided by a BS. It is also assumed that configuration related to finding a qualified cooperative UE for the cooperation may be provided by the BS to a UE. The configuration may be provided to the UE when the UE is using individual mode. It should be addressed that what configuration is needed to enable the UE to find qualified cooperative UE(s) for the cooperation mode.

Besides, a candidate cooperative UE may also need configuration from a BS to help the candidate cooperative UE determine how to respond finding from an originating UE.

The configuration may be provided by dedicated signaling. If some configuration can be cell-specific, it can be signaled by broadcasting, e.g. in system information.

Configuration for finding a qualified cooperative UE may include one or more of following parameters:
  A threshold of D2D channel condition
  This parameter may be used by a UE initiating finding to filter the UE not fulfilling the D2D channel condition of a qualified cooperative UE (if such filtering is needed to be done by the UE initiating finding). D2D channel condition may be measured based on response or reference signaling from a candidate cooperative UE and compared with the threshold.
  A threshold of Downlink (DL) channel condition
  This parameter may be used to check whether a UE needs to initiate procedure for finding.
  Configuration for D2D discovery
  The configuration may include transmission resource, transmitting power, and/or etc. for a UE to initiate D2D discovery and may include resource for the UE to monitor D2D response.
  Indication about which uplink data could be transmitted by cooperation mode
  The parameter may be needed if granularity to use cooperation mode is not UE based. For example, if it is radio bearer (RB) based, the parameter may indicate data from which RB(s) could be transmitted by cooperation mode. Then, this parameter may be used to check whether a UE needs to initiate procedure for finding, e.g. whether there is data from the RB(s) becoming available for cooperation mode transmission.
  Number of qualified cooperative UE to report
  The parameter may be used to control the maximum number of qualified cooperative UEs that needs to be reported if a BS does not need to know all founded UEs.

Configuration for a candidate cooperative UE may include one or more of following parameters:
  A threshold of D2D channel condition
  This parameter may be used by a candidate cooperative UE to check whether a UE fulfills the D2D channel condition of a qualified cooperative UE (if such check is needed to be done by the candidate cooperative UE). D2D channel condition may be measured based on finding message or reference signaling from the UE finding the candidate cooperative UE and compared with the threshold.
  A threshold of DL channel condition
  This parameter may be used to check whether a candidate cooperative UE needs to respond a UE initiating finding.

Configuration for D2D discovery
  The configuration may include resource for a UE to monitor D2D discovery and include transmission resource, transmitting power, and/or etc. for the UE to respond D2D discovery.
Indication about which uplink data could be transmitted by cooperation mode
  The parameter may be needed if granularity of cooperation mode transmission is not UE based. For example, if it is RB based, the parameter may indicate data from which RB(s) could be transmitted by cooperation mode. Then, this parameter may be used to check whether a candidate cooperative UE needs to respond a UE initiating finding, e.g. based on whether there is data available for cooperation mode transmission from the RB(s).

Configuration for finding a qualified cooperative UE and configuration for a candidate cooperative UE may be provided individually or together to a UE.

After a UE receives the configuration related to finding a qualified cooperative UE, the UE may initiate the procedure to find one or more qualified cooperative UE. Then, the UE may provide a notification to a BS about the finding. In the following, it is addressed that when or on what condition the UE starts to find a qualified cooperative UE, the details of the procedure, e.g. signaling flow, content of each signaling message, and the details of the notification to the BS, e.g. the content of the notification, timing to provide the notification.

The condition to start finding a qualified cooperative UE may include one or more of the following:
  Once a UE receives the configuration, the UE starts to find a qualified cooperative UE periodically. The configuration may be given to the UE when a BS detects that the channel condition between the BS and the UE becomes bad.
  Once a UE receives a request from a BS, the UE starts to find a qualified cooperative UE.
  When channel condition between a BS and a UE becomes bad, e.g. comparing with a threshold, and the UE has data available for cooperation mode transmission which could be transmitted via cooperation mode, the UE starts to find a qualified cooperative UE.
  When channel condition between a BS and a UE is bad, e.g. comparing with a threshold, and the UE has data becoming available for cooperation mode transmission which could be transmitted via cooperation mode, the UE starts to find a qualified cooperative UE.

The condition to stop finding a qualified cooperative UE may include one or more of the following:
  Once a UE receives the de-configuration, the UE stops finding a qualified cooperative UE periodically. The configuration may be given to the UE when a BS detects that the channel condition between the BS and the UE becomes good enough.
  Once a UE receives a request from a BS, the UE stops finding a qualified cooperative UE.
  When channel condition between a BS and a UE becomes good, e.g. comparing with a threshold, the UE stops finding a qualified cooperative UE.
  When a UE doesn't have data for cooperation mode transmission, the UE stops finding a qualified cooperative UE.

The condition to start monitoring finding for a qualified cooperative UE may include one or more of the following:
  Once a UE receives the configuration, the UE starts monitoring. The configuration may be given to the UE when a BS detects that the channel condition between the BS and the UE becomes bad.
  Once a UE receives a request from a BS, the UE starts monitoring.
  When channel condition between a BS and a UE becomes bad, e.g. comparing with a threshold, and the UE has data available for cooperation mode transmission which could be transmitted via cooperation mode, the UE starts monitoring.
  When channel condition between a BS and a UE is bad, e.g. comparing with a threshold, and the UE has data becoming available for cooperation mode transmission which could be transmitted via cooperation mode, the UE starts monitoring.

The condition to stop monitoring finding for a qualified cooperative UE may include one or more of the following:
  Once a UE receives the de-configuration, the UE stops monitoring. The configuration may be given to the UE when a BS detects that the channel condition between the BS and the UE becomes good.
  Once a UE receives a request from a BS, the UE stops monitoring.
  When channel condition between a BS and a UE becomes good, e.g. comparing with a threshold, the UE stops monitoring.
  When a UE doesn't have data for cooperation mode transmission, the UE stops monitoring.

Figure 9:
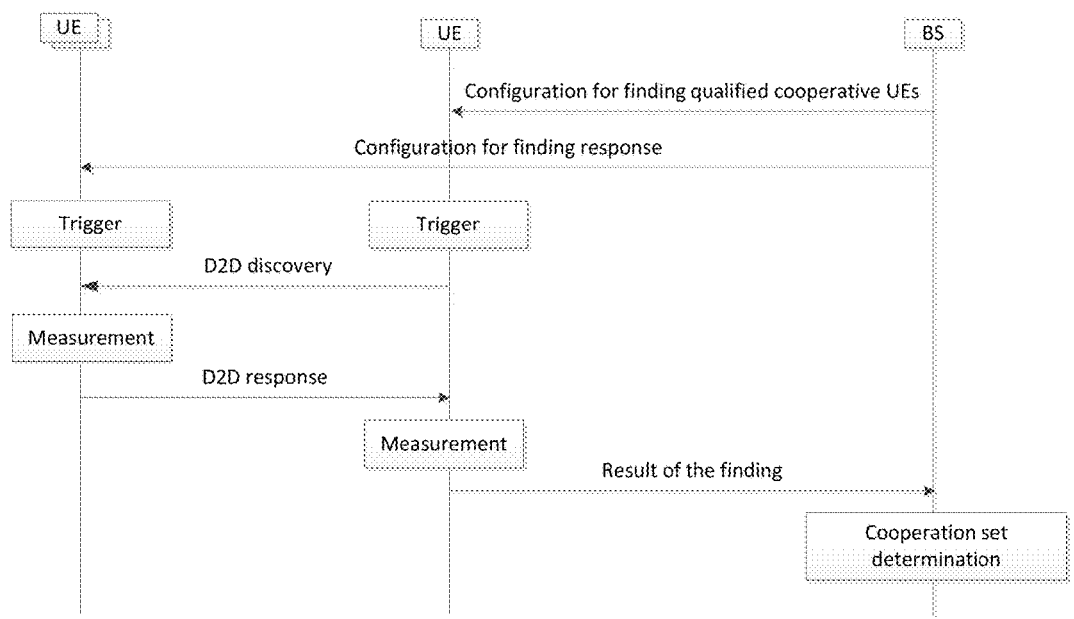
FIG. 9 illustrates one embodiment for finding a qualified cooperative UE.

The procedure for finding a qualified cooperative UE is illustrated in FIG. 9.

From a UE initiating finding point of view, one or more of the following steps may be performed (in sequence):
  Receive related configuration
  Trigger D2D discovery and measurement
  Transmit a D2D discovery message and start monitoring response.
    The D2D discovery message may include UE ID, serving cell of the UE, purpose of the discovery, e.g. to find a qualified cooperative UE, and/or etc. The D2D discovery message may be transmitted periodically to take care of a new coming cooperative UE.
  Receive a D2D response message. Upon receiving the D2D response message, the UE may evaluate whether D2D channel condition is qualified based on measurement on the reception of the D2D response message or D2D reference signal from a sender. The UE may also log the measurement result.
  Transmit a notification to a BS. It is assumed that the cooperative UE may be decided by the BS, and the notification may include all or part of the detected qualified cooperative UE(s), e.g. first $n^{th}$ UEs ordered by D2D channel condition.
    The notification may be transmitted if the UE hasn't transmitted the notification after initiating finding, when the qualified cooperative UE(s) to be included in the notification is different from last time reported, and/or when it is requested by the BS.
    The notification may also include the associated measurement result.

From a candidate cooperative UE point of view, one or more of the following steps may be performed (in sequence):
  Receive related configuration
  Trigger monitoring D2D discovery and measurement
  Receive a D2D discovery message. Upon receiving the D2D discovery message, a UE may evaluate whether D2D channel condition is qualified based on measurement on the reception of the D2D discovery message or D2D reference signal from a sender. And the UE may also check whether the sender of the D2D discovery message connects to the same serving cell as the UE, e.g. based on the content of the D2D discovery message, based on the resource of receiving the D2D discovery message.

Transmit a D2D response message. The UE may perform some check to decide whether to transmit the message, e.g. if the D2D channel condition is qualified and/or if the sender connects to the same serving cell as the UE.
The D2D response message may include UE ID, serving cell of the UE, and/or etc.

There may be other variations of the procedure. By way of example but not of limitation, the model of D2D discovery could be single message instead of two messages.

Figure 10:
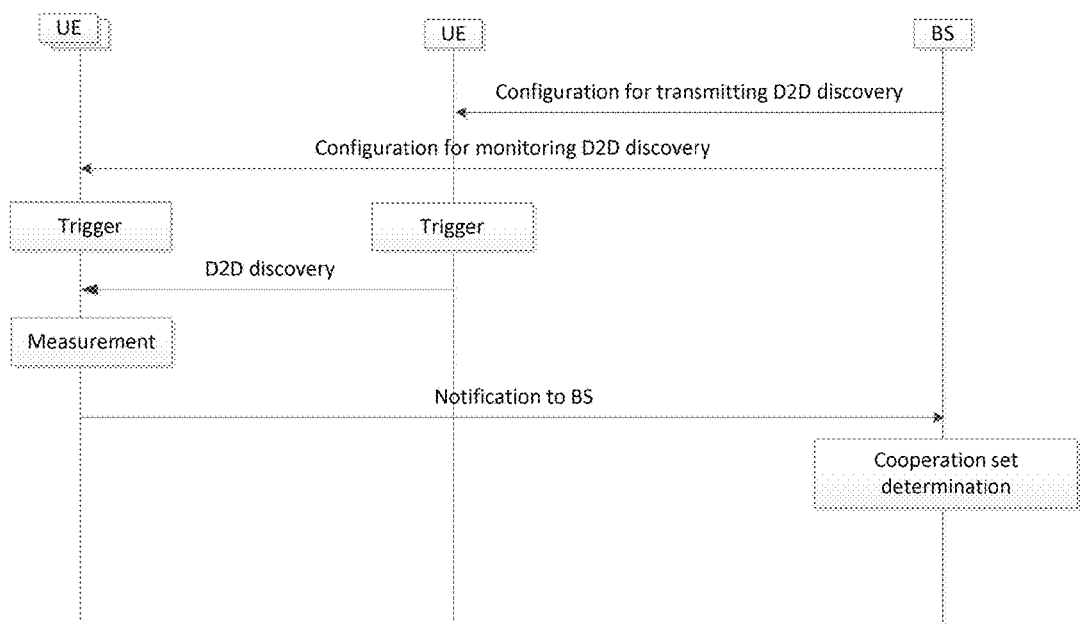
FIG. 10 illustrates another embodiment for finding a qualified cooperative UE.

FIG. 10 illustrates an alternative procedure for finding a qualified cooperative UE.

From a UE initiating finding point of view, one or more of the following steps may be performed (in sequence):
Receive related configuration
Trigger D2D discovery and measurement
Transmit a D2D discovery message
The D2D discovery message may include UE ID, serving cell of the UE, purpose of the discovery, e.g. to find qualified cooperative UE, and/or etc. The D2D discovery message may be transmitted periodically to take care of a new coming cooperative UE.

From a candidate cooperative UE point of view, one or more of the following steps may be performed (in sequence):
Receive related configuration
Trigger monitoring D2D discovery and measurement
Receive a D2D discovery message. Upon receiving the D2D discovery message, a UE may evaluate whether D2D channel condition is qualified based on measurement on the reception of the D2D discovery message or D2D reference signal from a sender. And the UE may also check whether sender of the D2D discovery message connects to the same serving cell as the UE, e.g. based on the content of the D2D discovery message or based on the resource of receiving the D2D discovery message.
Transmit a notification to a BS. It is assumed that the cooperative UE may be decided by the BS, and the notification from the UE may assist BS to decide the cooperative UE. The UE may perform some check to decide whether to transmit the notification, e.g. if the D2D channel condition is qualified and/or if the sender connects to the same serving cell as the UE.
The notification may also include the associated measurement result.

Figure 11:
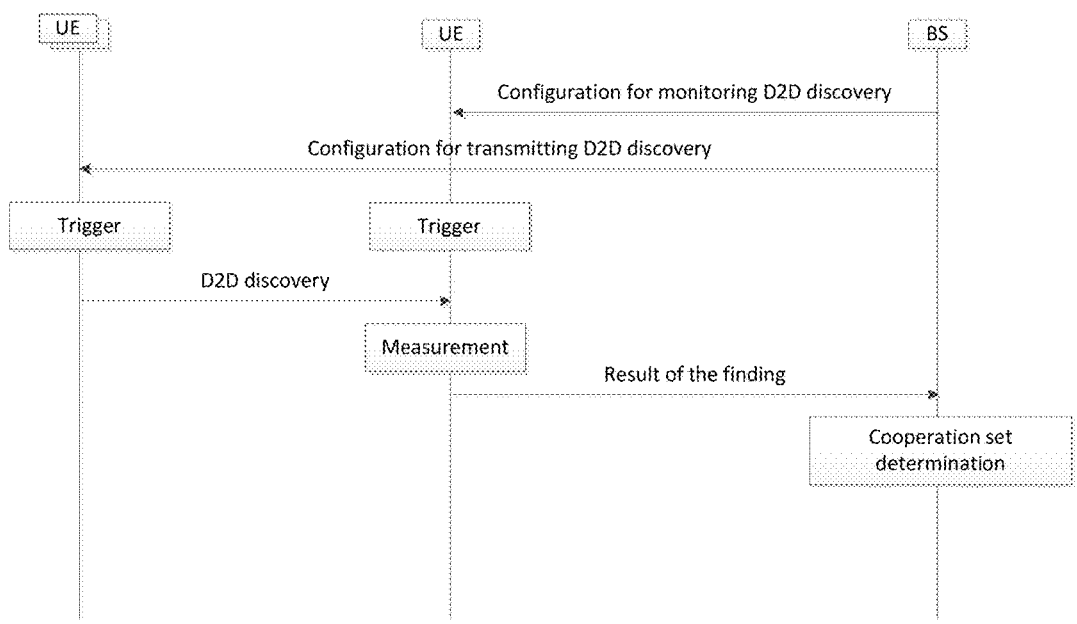
FIG. 11 illustrates yet another embodiment of finding a qualified cooperative UE.

FIG. 11 illustrates another alternative procedure for finding a qualified cooperative UE.

From a UE initiating finding point of view, one or more of the following steps may be performed (in sequence):
Receive related configuration
Trigger monitoring D2D discovery and measurement
Receive a D2D discovery message. Upon receiving the D2D discovery message, the UE may evaluate whether D2D channel condition is qualified based on measurement on the reception of the D2D discovery message or D2D reference signal from a sender. And the UE may also check whether sender of the D2D discovery message connects to the same serving cell as the UE, e.g. based on the content of the D2D discovery message or based on the resource of receiving the D2D discovery message.
Transmit a notification to a BS. It is assumed that the cooperative UE may be decided by the BS, and the notification from the UE may assist the BS to decide the cooperative UE. The UE may perform some check to decide whether to transmit the notification, e.g. if the D2D channel condition is qualified and/or if the sender connects to the same serving cell as the UE.
The notification may also include the associated measurement result.

From a candidate cooperative UE point of view, one or more of the following steps may be performed (in sequence):
Receive related configuration
Trigger D2D discovery and measurement
Transmit a D2D discovery message
The D2D discovery message may include UE ID, serving cell of a UE, purpose of the discovery. The D2D discovery message may be transmitted periodically.

Another solution of finding a qualified cooperative UE is that a BS would find a qualified cooperative UE. As mentioned above, the BS may determine whether a candidate cooperative UE is qualified based on at least the following criteria:
Channel condition between originating UE and cooperative UE
The BS may configure D2D measurement and the related measurement reporting to the UEs.
The D2D measurement may be used to detect the D2D channel condition between the UEs. The D2D measurement may be achieved by D2D discovery and response or some kind of D2D measurement signal.
The D2D measurement reporting may include the measurement result of D2D channel condition toward UEs. The reporting may be triggered periodically or triggered by an event, e.g. an event about a new UE is available or an event about an existing UE has changed a lot.
The D2D measurement and reporting procedure may be similar to what illustrated in FIG. 9, 10, or 11.
Channel condition between a BS and a cooperative UE
A BS can know this based on UE reporting, e.g. PHR, CSI.
Buffer status and delay constraint of data available for cooperation mode of a cooperative UE
A BS can know this based on Buffer Status Report (BSR) reported by UEs.
Connectivity status of a cooperative UE
A BS can know this already.
Capability and user consent of a cooperative UE
A BS can know this based on UE capability information.

When qualified cooperative UE(s) has been found, initial cooperative UE(s) for the cooperation mode transmission may be determined. And after a UE starts to use cooperation mode, the UE may need to maintain its cooperative UE(s) since its cooperative UE(s) may keep changing.

The cooperative set may be defined as a set comprising candidate cooperative UE(s) involved in the cooperation of an uplink transmission.

The notification to a BS in response to the finding may assist the BS to determine an initial cooperation set for the UE if the cooperative set is determined by the BS. And the UE may keep performing the procedure for finding a qualified cooperative UE and provide update of founded qualified cooperative UE by transmitting the notification. Then, the BS may update the cooperative set accordingly. The UE may stop performing the procedure when the cooperation mode is disabled. Alternatively, the UE may stop performing the procedure when it doesn't want to find a cooperative UE anymore (e.g. when cooperation mode is disabled) or the UE doesn't want to use cooperation mode anymore (possibly based on network configuration) (e.g. when cooperation mode is enabled), and the UE may transmit a notification to the BS.

It is assumed that cooperation mode may be enabled and disabled by the BS. When the BS decides to enable or disable the cooperation mode of a UE, it may need to provide the cooperation mode related configuration to the UE. The configuration to enable the cooperation mode and the configuration to disable the cooperation mode may be separately considered.

One or multiple of following configuration may be required to enable cooperation mode for an originating UE:
Originating UE ID
 The UE may need an ID for cooperation mode, which is different from that used for individual mode. The ID may be used to monitor signaling from a BS, e.g. uplink grant allocation.
Cooperation set
 If an originating UE needs to know its cooperation set, e.g. used to determine whether there is any change of the set later, a cooperation set may be included in the configuration. The cooperation set may include the UE ID of each cooperative UE in the cooperation set.
Maximum number of uplink retransmission
 The maximum number of uplink retransmission for a cooperative data.
Configuration for cooperative data distribution
 The configuration may include transmission (Tx) power, retransmission parameter(s), group ID for a cooperation set, and/or etc. for a UE to distribute cooperative data.

One or multiple of following configuration may be required to enable cooperation mode for a cooperative UE:
Originating UE ID(s)
 A UE(s) who needs cooperation help from the UE. The ID may be used to monitor cooperative data from those originating UEs. The ID may also be used to monitor signaling from a BS to those originating UEs, e.g. uplink grant allocation.
D2D reception pool
 A UE may monitor resources in the pool to receive distributed cooperative data from an originating UE(s).
Group ID for a cooperation set
 A UE may monitor a D2D transmission destined to the group ID.
Maximum number of uplink retransmission
 The maximum number of uplink retransmission for a cooperative data.

The mode of uplink transmission may be switched dynamically.

One alternative is that activation/deactivation may be used in addition to the configuration to enable/disable the cooperation mode of a UE. The signaling to activate/deactivate the cooperation mode may be lower layer signaling addressed to all UEs in a cooperation set, e.g. a group ID.

Another alternative is that each uplink grant may indicate whether cooperation mode is used for the uplink transmission corresponding to the grant. For example, different UE ID is used to allocate the uplink grant for cooperation mode transmission and the uplink grant for individual mode transmission.

After receiving the configuration, the timing for the UE to start using cooperation mode or individual mode after receiving the configuration to enable or disable cooperation mode may be considered. Besides, the UE may perform additional actions, e.g. upon enabling or disabling cooperation mode, to modify the configuration of the cooperation mode.

The UE may start using cooperation mode or individual mode from the response message to the configuration.

If the granularity of cooperation mode transmission is not UE based, network configuration may indicate whether the response message to the configuration uses cooperation mode, e.g. depend on the radio bearer used to transmit the response message.

After cooperation mode is enabled (or activated), the ongoing retransmission may still use individual mode.

After cooperation mode is disabled (or deactivated), cooperative data from other UE may not be transmitted, e.g. data in the uplink buffer is flushed.

After the originating UE of the cooperation mode transmission is not valid anymore (e.g. the originating UE is removed from the configuration, the originating UE cannot be detected anymore, D2D channel condition between the originating UE and the UE becomes bad), the cooperative UE may not transmit the cooperative data of the UE not in a cooperation set, e.g. flush the cooperative data.

Cooperation mode transmission requires an originating UE and cooperative UE(s) to perform uplink transmission cooperatively. Since cooperative data is transmitted by these UEs, the cooperative data may need to be distributed via D2D transmission from the originating UE to all other cooperative UE(s) before it is transmitted in uplink cooperatively.

The originating UE may need to acquire D2D resource for the D2D transmission. The cooperative UE(s) may need to monitor the D2D resource to receive the cooperative data.

Since every UE using cooperation mode may be an originating UE, each UE may transmit its cooperative data via D2D transmission to other cooperative UE(s). In order for all UEs to transmit and receive cooperative data successfully, D2D resource coordination may be necessary, e.g. to prevent collision.

It is assumed that the cooperative data may be generated based on uplink resource acquired by the originating UE.

It is assumed that the D2D transmission and uplink transmission may be synchronous and controlled by BS.

If the D2D transmission and uplink transmission is asynchronous, the benefit may be that the data rate for D2D is higher than the data rate for UL. However, if D2D resource and uplink resource are not 1-to-1 mapping, the cooperative UE needs to handle how to construct a PDU from the received D2D data for the uplink transmission, and the content of the PDU needs to be aligned between originated UE and all cooperative UEs.

The originating UE may firstly inform a BS about the buffer status corresponding to data for cooperation mode. The BS then may allocate uplink grant and/or D2D grant for the cooperative data. The timing relation between grant reception, D2D transmission, and uplink transmission should be fixed or configured.

For an originating UE, one or more of the following methods may be considered to acquire D2D resource:
 The D2D resource may be allocated by a signaling specifically for D2D resource allocation.
 Since the D2D transmission needs to be performed after the originating UE receives UL grant, the D2D resource for distributing a cooperative data may be allocated together with UL grant used to transmit the cooperative data, i.e. by the same signaling.

Since the size of D2D resource may be proportional to the size of the UL grant or the difference of these two sizes are fixed, the originating UE may derive one of them based on receiving the other one of them, or reuse at least some information of the other grant. For example, a signaling includes complete information of the UL grant but not complete or no information specifically for the D2D resource. Information of TB (transport block) size may be reused. Information of MCS (modulation and coding scheme) may be reused. The originating UE may still derive the D2D resource based on the signaling.

The originating UE may use the UL grant to distribute the cooperative data, i.e. no need to have additional D2D resource.

For a cooperative UE, one or more of the following methods may be considered to acquire D2D resource:

Resource pool, the cooperative UE should monitor, may be configured by a BS. Then, the cooperative UE may try to receive D2D transmission (destined to the group ID of the cooperation set) via resources in the resource pool. The resource pool (and the group ID) to monitor may be configured as part of configuration used to enable cooperation mode.

The D2D resource for receiving the cooperative data may be allocated by the BS. If a group ID is used to address the D2D resource, the D2D resource may be indicated to the originated UE and cooperative UE(s) in the same signaling.

The cooperative UE may monitor D2D resource allocation signaling from the BS to the originating UE. Then, the cooperative UE knows the exact resource used by the originating UE to perform D2D transmission. In order to realize this mechanism, the cooperative UE may need to know how to receive D2D resource allocation signaling from BS to the originating UE. The necessary configuration, e.g. to decode the signaling and to identify the target of the signaling, may need to be provided to the cooperative UE as part of configuration used to enable cooperation mode.

The cooperative UE may monitor UL grant allocation signaling from the BS to the originating UE. If the UL grant can be used (or to derive the resource) for D2D transmission, the cooperative UE knows the exact resource used by the originating UE to perform D2D transmission. In order to realize this mechanism, the cooperative UE may need to know how to receive UL grant allocation signaling from the BS to the originating UE. The necessary configuration, e.g. to decode the signaling and to identify the target of the signaling, needs to be provided to the cooperative UE as part of configuration used to enable cooperation mode.

After acquiring D2D resource, the originating UE may need to transmit the cooperative data to its cooperative UE(s) via D2D transmission. And a cooperative UE may need to receive the cooperative data via D2D transmission.

And the cooperative UE may need to provide confirmation to the UE transmitting data in order to indicate the successful delivery of the data.

Moreover, single D2D transmission may not be robust enough and retransmission may be needed to increase the successful rate of data distribution.

If D2D resource and related parameter(s), e.g. MCS, are explicitly indicated by the BS, the originating UE may distribute the cooperative data via the D2D resource accordingly. The power used to distribute the cooperative data may be the same as that used for finding cooperative UE(s) or also explicitly indicated by the BS.

If D2D resource is not explicitly indicated by the BS, the originating UE may firstly derive the D2D resource (and related parameter(s)) and then distribute the cooperative data via the D2D resource accordingly. The power used to distribute the cooperative data may be the same as that used for finding cooperative UE(s) or also explicitly indicated by the BS.

If D2D resource is not used for distribution, the originating UE may distribute the cooperative data based on the UL grant and related parameter(s) accordingly. The related parameter(s) may be specifically used for distribution and explicitly indicated by the BS or may be the same as those used for uplink transmission, i.e. the originating UE performs uplink transmission which also achieves the purpose of distributing cooperative data to its cooperative UE(s). The power used to distribute the cooperative data may be the same as that used for finding cooperative UE(s), explicitly indicated by the BS, or the same as that used for uplink transmission.

One or more of the following methods for feedback and/or retransmission may be used:

As an alternative, a fixed number of retransmission may be defined and feedback may not be used. The cooperative UE may monitor scheduling information (e.g., Scheduling Assignment (SA)) for receiving cooperative data via D2D communication. If the cooperative UE fails to receive the cooperative data, it doesn't perform uplink transmission for the cooperative data.

As another alternative, a fixed number of maximum retransmission may be defined and negative feedback may be used. The cooperative UE failing to receive the cooperative data may transmit NACK to the originating UE. The originating UE may retransmit the cooperative data until the maximum number of retransmission is reached. If the originating UE doesn't receives any NACK before maximum number of retransmission is reached, it can stop the retransmission.

In addition, a cooperative UE may need to notify the BS that the cooperative UE fails to receive cooperative data from a specific originating UE. The timing to transmit the notification may include one or more of the following:

After a period of time without receiving cooperative data from the specific originating UE.

If the exact D2D resource to monitor is known but fails to receive corresponding cooperative data after several attempts to receive associated retransmission(s).

In addition to cooperative data, some additional information may also be provided from the originating UE to its cooperative UE(s) via D2D transmission. The additional information may include one or multiple of following parameters:

An indication about who transmits the cooperative data or who needs to receives the cooperative data. For example, part or complete of originating UE ID may be included.

The information that may assist the cooperative UE to perform uplink transmission.

For example, uplink grant may be included in the same D2D transmission as cooperative data to indicate which uplink resource should be used to transmit the cooperative data in uplink direction.

The timing to perform uplink transmission may also be included to ensure every UE to perform the uplink transmission at the same time, e.g. timestamp, frame number.

The information that may assist the cooperative UE to encode the received cooperative data in order to perform uplink transmission.

For a cooperative UE, decoding of the cooperative data received from D2D transmission, e.g. which protocol layer(s) handles the decoding and buffering, and encoding of the cooperative data to transmit via uplink may be considered. One or more of the following methods may be used:

As an alternative, the cooperative UE may decode cooperative data from D2D transmission. The cooperative UE may then use the received uplink grant and related parameter(s) to encode the cooperative data. The cooperative data may be a Medium Access Control (MAC) Protocol Data Unit (PDU). The D2D transmission may use a Transport Block (TB) or a MAC PDU to carry the cooperative data.

As another alternative, it is assumed that the Redundancy Version (RV) may remain the same for every (re)transmission. The cooperative UE may perform a Cyclic Redundancy check (CRC) on the received D2D transmission. If the check passes, the cooperative UE then uses the received uplink grant to transmit the received D2D transmission. In other words, the cooperative UE may not need to perform decoding and encoding.

Regarding uplink transmission using cooperation mode, all UEs involving in cooperation of the same uplink transmission may use the same time-frequency resource to transmit the same cooperative data to the BS. The uplink resource to be used may need to be known by all these UEs. And all UEs may need to have the same understanding on which cooperative data is transmitted.

The originating UE may construct cooperative data to be transmitted in uplink based on the acquired uplink resource. And the uplink resource may be known by its cooperative UE(s).

An originating UE may need to request the BS to allocate uplink resource, e.g. uplink grant, for transmitting cooperative data. And it may be requested by Scheduling Request (SR) or Random Access (RA) procedure. One or more of the following method to perform resource requesting may be considered:

The originating UE may use individual mode to transmit a signaling, e.g. SR or RA preamble, to notify the BS to allocate uplink resource. In other words, the signaling is only transmitted by one UE, i.e. the originating UE.

The originating UE uses cooperation mode to transmit a signaling, e.g. SR or RA preamble, to notify the BS to allocate uplink resource. In other words, the signaling is transmitted simultaneously by the originating UE and its cooperative UE(s). In order to achieve this purpose, the cooperative UE may need to know when and how to transmit the signaling.

There are several alternatives for the cooperative UE to decide when to transmit the signaling: (1) the originating UE would notify the cooperative UE via D2D transmission; and/or (2) the cooperative UE would monitor whether the originating UE starts to transmit the signaling.

Then, the cooperative UE may need to know resource (including timing and frequency) used to transmit the signaling. This information could be provided by the originating UE via D2D transmission or by the BS, e.g. as part of configuration used to enable cooperation mode.

And the cooperative UE stops transmitting the signaling if it is notified by the originating UE or if uplink grant allocation is detected.

For a cooperative UE, one or more of the following methods to know the uplink resource may be considered:

The originating UE may indicate the uplink resource to its cooperative UE(s) via D2D transmission, e.g. together with cooperative data.

The BS may indicate the uplink resource to each cooperative UE. If a group ID is used to address the uplink resource, the uplink resource can be indicated to the originated UE and cooperative UE(s) in the same signaling.

The cooperative UE may monitor UL grant allocation signaling from the BS to the originating UE. Then, the cooperative UE knows the uplink resource for the associated cooperative data. In order to realize this mechanism, the cooperative UE may need to know how to receive UL grant allocation signaling from the BS to the originating UE. The necessary configuration, e.g. to decode the signaling and to identify the target of the signaling, may be provided to the cooperative UE as part of configuration used to enable cooperation mode.

Since the size of D2D resource may be proportional to the size of the uplink resource or the difference of these two sizes are fixed, the cooperative UE may derive the uplink resource based on the D2D resource where the cooperative data is received. And the cooperative UE may start to use the uplink resource after the originating UE stops using the D2D resource to perform retransmission of the cooperative data.

If the originating UE uses uplink resource to distribute the cooperative data, the cooperative UE can directly know the uplink resource based on where the cooperative data is received. And the cooperative UE may start to use the uplink resource at the timing to use the uplink resource to perform retransmission.

The cooperative UE may also use one or more of the above methods to know the uplink resource for adaptive retransmission.

All UEs involving in cooperation of the same uplink transmission may need to have the same understanding on which uplink resource is used to transmit which cooperative data. One or more of the following methods may be considered to achieve this.

Uplink grant may be indicated with the cooperative data.

Uplink grant and D2D grant (D2D assignment) may be both indicated to cooperative UE(s).

Uplink grant may be derived from D2D grant, or D2D grant is derived from uplink grant. Deriving may refer to reusing some information indicated by the other grant.

Single uplink transmission may not be robust enough and retransmission may be needed to increase the successful rate of delivery. Retransmission may be adaptive or non-adaptive. An UE involved in cooperation of the same uplink transmission may decide to perform retransmission depending on whether the UE is an originating UE or cooperative UE.

The originating UE and cooperative UEs may monitor feedback from the BS. The UEs may perform non-adaptive retransmission if a negative acknowledgement (NACK) is received. The UEs may perform adaptive retransmission if adaptive grant is received. The method to acquire adaptive grant is similar to the method to acquire uplink resource for a new transmission mentioned above.

Various aspects of cooperation mode transmission are considered above. Compared with individual mode transmission, cooperation mode transmission utilizes a group of UEs to perform uplink transmission cooperatively. It can improve uplink performance when VPL is high and the group of UEs is moving away from the BS. This is useful for scenarios like UEs in a vehicle or a train.

To achieve cooperation mode transmission, cases of enabling cooperation mode, performing cooperation mode transmission, and disabling cooperation mode are considered above. It is assumed that cooperation mode of a UE may be enabled or disabled by the BS. In addition, assistance from the UE may be required such as to find a qualified cooperative UE for cooperation mode transmission. This may be done via D2D discovery and/or D2D measurement.

After cooperative UE(s) is found and cooperation mode is enabled (and when there is data available for cooperation mode transmission), an originating UE may distribute cooperative data to its cooperative UE(s). Then the originating UE and its cooperative UE(s) may perform uplink transmission cooperatively to transmit the cooperative data.

Figure 12:
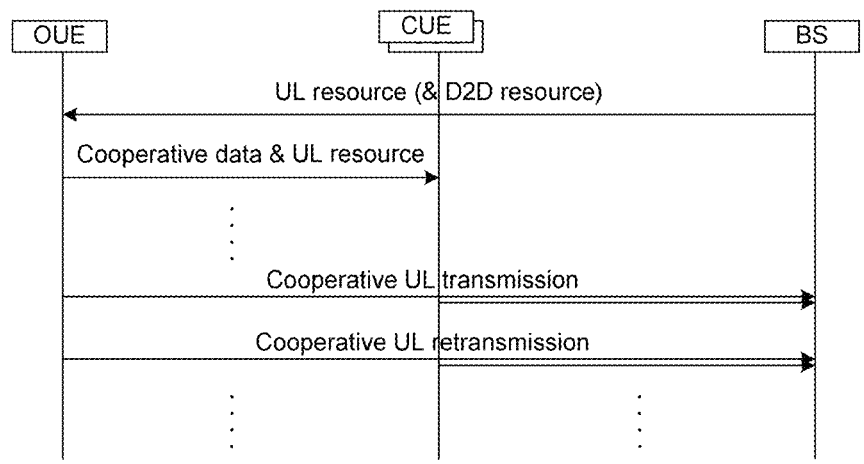
FIG. 12 illustrates one embodiment of cooperation mode transmission.

Several examples of cooperation mode transmission are illustrated below. Not all possible combinations are shown here, and more examples can be derived by replacing some part of one example by corresponding part of another example. One example of cooperation mode transmission as described below is also shown in FIG. 12.

|  | UL resource | D2D resource |
|---|---|---|
| OUE (Originating UE) | Received from BS | Received from BS |
| CUE (Cooperative UE) | Received from OUE | Received from OUE |

Step 1: The originating UE acquires UL resource and D2D resource (jointly or separately) from BS.
Step 2: The originating UE informs the cooperative UE(s) about the D2D resource to receive cooperative data and UL resource.
Step 3: The originating UE transmits cooperative data and UL resource to the cooperative UE(s) via the D2D resource.
Step 4: The originating UE and the cooperative UE(s) use the UL resource to transmit cooperative data in uplink.

Figure 13:
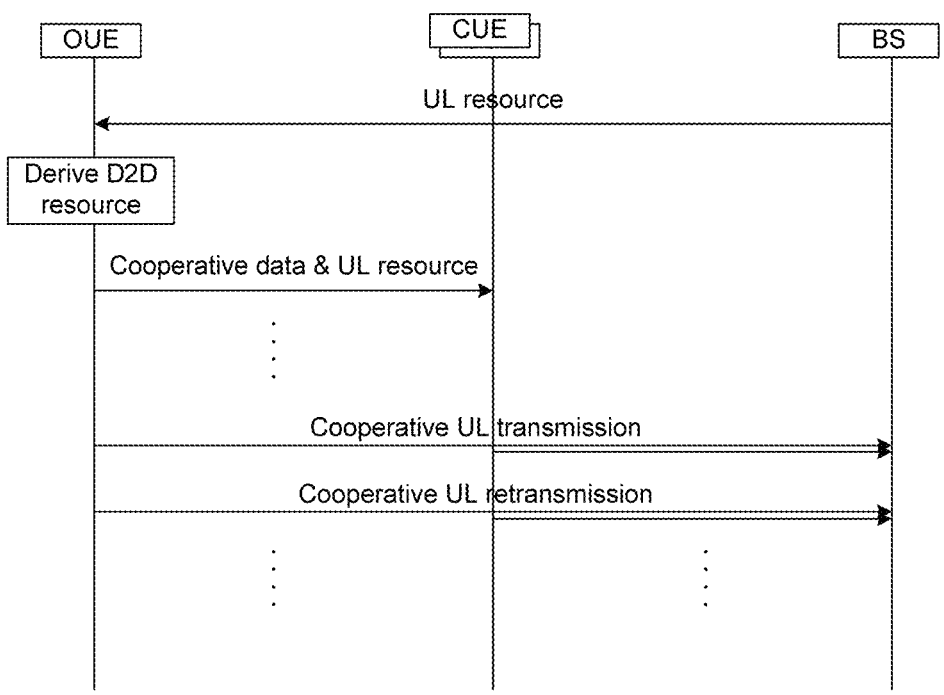
FIG. 13 illustrates another embodiment of cooperation mode transmission.

Another example of cooperation mode transmission as described below is also shown in FIG. 13.

|  | UL resource | D2D resource |
|---|---|---|
| OUE | Received from BS | Derived from UL resource |
| CUE | Received from OUE | Received from OUE |

Step 1: The originating UE acquires UL resource from BS.
Step 2: The originating UE derives D2D resource from the UL resource.
Step 3: The originating UE informs the cooperative UE(s) about the D2D resource to receive cooperative data and UL resource.
Step 4: The originating UE transmits cooperative data and UL resource to the cooperative UE(s) via the D2D resource.
Step 5: The originating UE and the cooperative UE(s) use the UL resource to transmit cooperative data in uplink.

Figure 14:
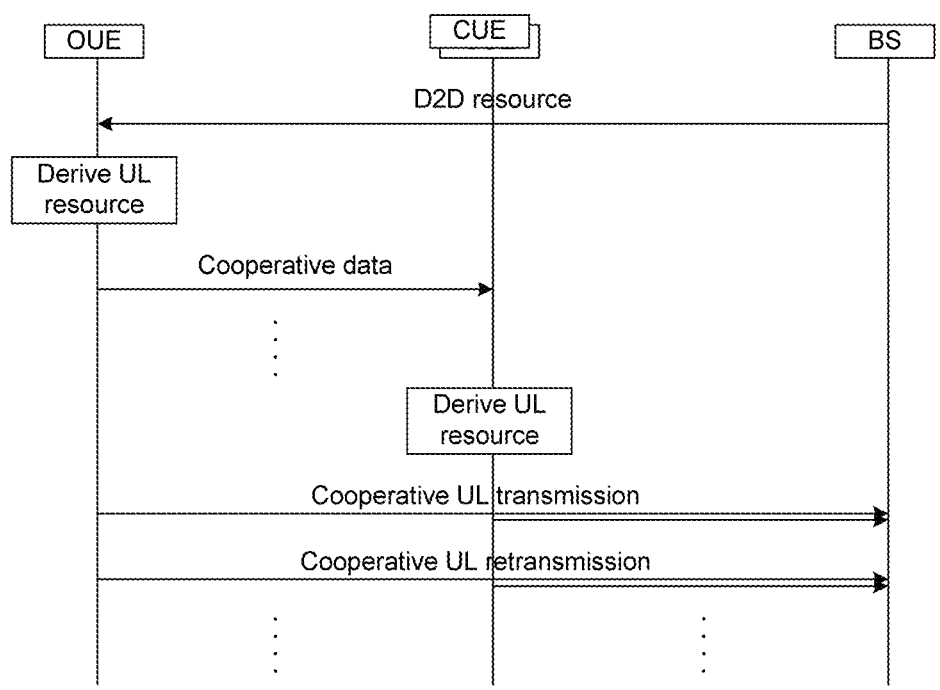
FIG. 14 illustrates another embodiment of cooperation mode transmission.

Another example of cooperation mode transmission as described below is also shown in FIG. 14.

|  | UL resource | D2D resource |
|---|---|---|
| OUE | Derived from D2D resource | Received from BS |
| CUE | Derived from D2D resource | Received from OUE |

Step 1: The originating UE acquires D2D resource from BS.
Step 2: The originating UE derives UL resource from the D2D resource.
Step 3: The originating UE informs the cooperative UE(s) about the D2D resource to receive cooperative data.
Step 4: The originating UE transmits cooperative data to the cooperative UE(s) via the D2D resource.
Step 5: The cooperative UE(s) derives UL resource from the D2D resource.
Step 6: The originating UE and the cooperative UE(s) use the UL resource to transmit cooperative data in uplink.

Figure 15:
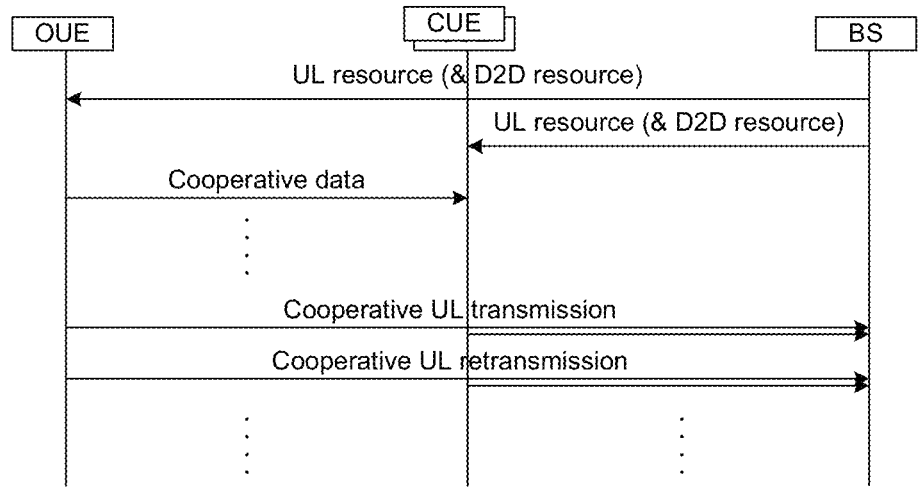
FIG. 15 illustrates another embodiment of cooperation mode transmission.

Yet another example of cooperation mode transmission as described below is also shown in FIG. 15.

|  | UL resource | D2D resource |
|---|---|---|
| OUE | Received from BS | Received from BS |
| CUE | Received from BS | Received from BS |

Step 1: The originating UE acquires UL resource and D2D resource from BS.
Step 2: The cooperative UE acquires UL resource and D2D resource from BS.
Step 3: The originating UE transmits cooperative data to the cooperative UE(s) via the D2D resource.
Step 4: The originating UE and the cooperative UE(s) use the UL resource to transmit cooperative data in uplink.

Figure 16:
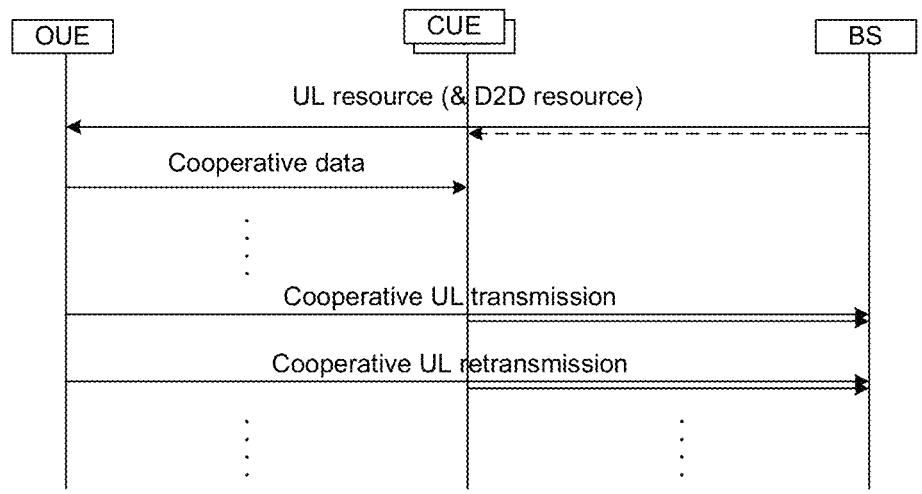
FIG. 16 illustrates another embodiment of cooperation mode transmission.

Another example of cooperation mode transmission as described below is also shown in FIG. 16.

|  | UL resource | D2D resource |
|---|---|---|
| OUE | Received from BS | Received from BS |
| CUE | Monitor the signaling from BS to OUE | Monitor the signaling from BS to OUE |

Step 1: The originating UE acquires UL resource and D2D resource from BS. The cooperative UE monitors the UL resource and D2D resource allocation from BS to the originating UE.
Step 2: The originating UE transmits cooperative data to the cooperative UE(s) via the D2D resource.
Step 3: The originating UE and the cooperative UE(s) use the UL resource to transmit cooperative data in uplink.

Figure 17:
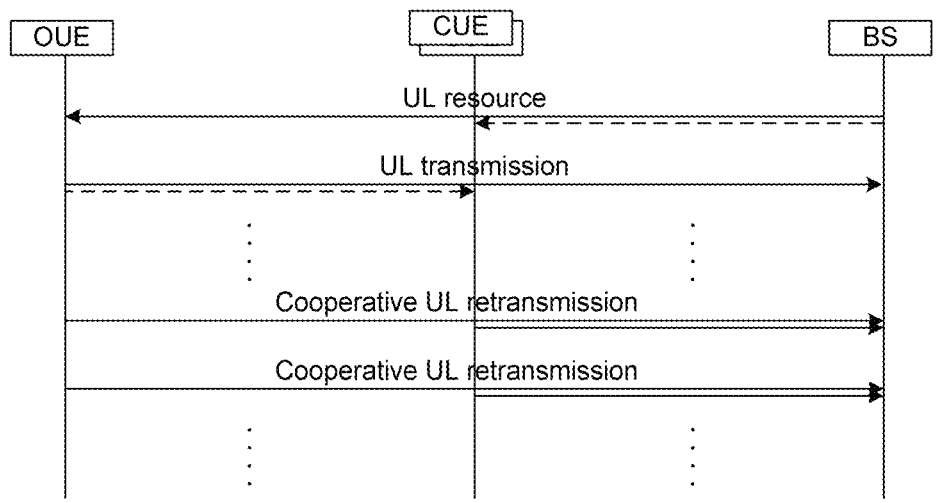
FIG. 17 illustrates another embodiment of cooperation mode transmission.

Another example of cooperation mode transmission as described below is also shown in FIG. 17.

|  | UL resource | D2D resource |
|---|---|---|
| OUE | Received from BS | N/A |
| CUE | Monitor the signaling from BS to OUE | UL resource (receive UL Transmission (Tx) from OUE) |

Step 1: The originating UE acquires UL resource from BS. The cooperative UE monitors the UL resource allocation from BS to the originating UE.

Step 2: The originating UE uses the UL resource for a transmission. The cooperative UE attempts to receive the UL transmission from the originating UE, and uses the received data as the cooperative data.

Step 3: When the originating UE performs retransmission for the transmission, the cooperative UE(s) use the same UL resource to transmit cooperative data in uplink.

Cooperation mode transmission may not be suitable for all kinds of data. For example, delay-sensitive data may not be suitable for cooperation mode transmission. Since cooperation mode transmission requires the data to be distributed to other UE(s) before it is transmitted in uplink, the latency of cooperation mode transmission may be larger than the latency of individual mode transmission (depending on how cooperation mode is performed). Using cooperation mode to transmit data not suitable for cooperation mode transmission may fail to meet the QoS requirement of the data traffic.

To solve the problem, an indication from BS to UE may be used to indicate what kind of data could be transmitted by cooperation mode. The UE determines whether data is transmitted using cooperation mode at least based on the indication. If cooperation mode is not enabled (or cannot be used), data is transmitted using individual mode. If cooperation mode is enabled (and can be used), data that could be transmitted by cooperation mode is transmitted using cooperation mode. If cooperation mode is enabled (and can be used), data that could not be transmitted by cooperation mode is transmitted using individual mode.

The indication may indicate data from which RB(s) could be transmitted by cooperation mode. If cooperation mode is enabled (and can be used), data from RB that could be transmitted by cooperation mode is transmitted using cooperation mode. If cooperation mode is enabled (and can be used), data from RB that could not be transmitted by cooperation mode is transmitted using individual mode. The granularity to use cooperation mode may be RB based.

The indication may be provided to assist the UE for finding a qualified cooperative UE. The indication may assist the UE to determine whether the UE needs to initiate a procedure to find a qualified cooperative UE. For example, the UE determines whether to initiate a procedure to find a qualified cooperative UE at least based on whether the UE has data available for cooperation mode transmission. The UE may check whether there is data available from RB that could be transmitted using cooperation mode to determine whether to initiate a procedure to find a qualified cooperative UE.

The indication may assist the UE to determine whether the UE transmits a D2D discovery. The indication may assist the UE to determine whether the UE responds to a D2D discovery. The indication may be provided to a candidate cooperative UE. The D2D discovery may be used to find a qualified cooperative UE. The indication may be included in a configuration provided from BS to UE.

In one embodiment, the configuration may be used to enable cooperation mode of the UE. The configuration may be provided to the UE before cooperation mode is enabled.

The indication or the configuration may be valid when the UE determines whether data can be transmitted using cooperation mode.

Uplink transmission using individual mode is transmitted by one UE at the same time. Uplink transmission using cooperation mode is transmitted by multiple UEs at the same time. Cooperative data may refer to the data to be transmitted by cooperation mode.

According to one method, a UE receives an indication that indicates a type of data that can be transmitted using cooperation mode. The UE transmits a first data using the cooperation mode, wherein the first data belongs to the type of data using cooperation mode based on the indication. The UE transmits a second data without using the cooperation mode, wherein the second data does not belong to the type of data using cooperation mode based on the indication. In this method, the cooperation mode is enabled when transmitting the first data and the second data. That is, the cooperation mode is enabled during data transmission, but only data belonging to the type of data indicated by the indication is transmitted using the cooperation mode.

In other words, the UE determines whether to use cooperation mode for a transmission at least based on the indication. The type of data is data from one or more specific radio bearers. The indication identifies data from which radio bearers can be transmitted using cooperation mode. The first data is transmitted using cooperation mode if the cooperation mode is enabled (and can be used for data transmission). The second data is transmitted without using cooperation mode if cooperation mode is enabled (and can be used for data transmission).

The granularity to use the cooperation mode transmission is radio bearer based. Data transmitted using the cooperation mode is transmitted by more than one UE using the same time-frequency resource.

If a data transmission is not using cooperation mode, the individual mode is used. The data transmitted using individual mode is transmitted by one UE using a dedicated time-frequency resource assigned to the UE.

The UE can determine whether data for cooperation mode transmission is available at least based on the indication. The UE can determine whether to initiate the finding of a qualified cooperative UE based on at least the indication. In one alternative, the UE initiates the finding of a qualified cooperative UE after data for cooperation mode transmission is available. The UE initiates the finding of a qualified cooperative UE by transmitting a D2D discovery.

In the various methods disclosed herein, the data transmitted using cooperation mode is referred to cooperative data. In the various methods disclosed herein, a cooperative UE is referred to a UE receiving cooperative data for transmitting the cooperative data using cooperation mode. In various methods disclosed herein, an originating UE is referred to a UE generating cooperative data for transmitting the cooperative data using cooperation mode.

In the methods disclosed herein, the UE determines whether to respond a D2D discovery for finding a qualified cooperative UE based on at least one indication. The UE determines whether to transmit a notification to a base station based on at least the indication. In these various methods, the indication is included in a configuration from the base station sent to the UE. The configuration is used to enable the cooperation mode of the UE. In the various methods disclosed herein, the configuration is provided to the UE before the cooperation mode is enabled. The indication or the configuration is valid when the UE determines whether or not data is transmitted using the cooperation mode.

In the various methods disclosed herein, data is transmitted on an uplink data channel such as, but not limited to, a Physical Uplink Shared Channel (PUSCH). In the various methods disclosed herein, data for cooperation mode transmission is referred to data that can be transmitted using cooperation mode.

To find a qualified cooperative UE, D2D discovery, D2D response, and/or D2D measurement may be used. One option for a UE to start (or stop) the search for a qualified cooperative UE is when the UE receives a related configuration or de-configuration. The de-configuration may refer to the reconfiguration to remove the related configuration. This may be similar for the UE to start (or stop) monitoring the search for a qualified cooperative UE, i.e. when the UE receives the related configuration or de-configuration. The timing to provide the (re)configuration is up to the base station (BS). However, the suitability of the UE to initiate or to monitor the finding of a qualified cooperative UE may change from time to time depending on one or more of the following: UL/DL channel condition, whether the data is available for transmission, the kind of data available for transmission, or the like. If the BS controls the finding (or the monitoring for the finding) of a qualified cooperative UE efficiently, frequent reconfiguration may be caused to enable the UE to initiate (or stop) the finding (or the monitoring). If the BS controls the finding (or the monitoring) statically, unnecessary power and resource may be wasted.

In order to reduce unnecessary power utilization and resources consumption, when to start finding of a qualified cooperative UE may be determined by a UE and when to stop finding of the qualified cooperative UE may be determined by the UE.

When the channel condition between a BS and a UE becomes bad (e.g., based on a comparison to a threshold value) and the UE has data available for cooperation mode transmission, the UE can initiate a search for a qualified cooperative UE. Alternatively, when channel condition between a BS and a UE is bad (e.g., based on a comparison to a threshold value) and the UE has data becoming available for cooperation mode transmission, the UE may start to find a qualified cooperative UE.

The UE may stop finding a qualified cooperative UE when the channel condition between a BS and the UE becomes good (e.g., based on a comparison with a threshold value). Alternatively, the UE may stop finding a qualified cooperative UE when the UE doesn't have data for cooperation mode transmission.

When the channel condition between a BS and a UE becomes bad (e.g., based on a comparison to a threshold value) and the UE has data available for cooperation mode transmission, the UE can initiate monitoring to find a qualified cooperative UE. Alternatively, when channel condition between a BS and a UE is bad (e.g., based on a comparison to a threshold value) and the UE has data becoming available for cooperation mode transmission, the UE may start monitoring to find a qualified cooperative UE.

The UE may stop monitoring to find a qualified cooperative UE when the channel condition between a BS and the UE becomes good (e.g., based on a comparison with a threshold value). Alternatively, the UE may stop monitoring to find a qualified cooperative UE when the UE doesn't have data for cooperation mode transmission.

In some methods, the UE transmits a notification to a BS when the UE stops the search for a qualified cooperative UE. The UE may be in individual mode or use individual mode for transmission. The cooperation mode of the UE may be disabled.

The UE may stop the search for a qualified cooperative UE when the UE no longer wants to find a cooperative UE. The UE may send a notification to the BS to notify that the UE does not want to find a cooperative UE. In one method, the notification sent to the BS may notify that the UE does not use cooperation mode. In some methods, the notification may indicate that no (qualified and/or candidate) cooperative UE was found.

According to one method, a UE initiates a procedure of finding a qualified cooperative UE when the following conditions are fulfilled: (1) channel condition between a base station and the UE is worse than a first threshold value; and (2) the UE has data available for cooperation mode transmission. The procedure is performed by transmitting a D2D discovery. Alternatively, the procedure is initiated when the channel condition between the base station and the UE becomes worse than the first threshold value, and the UE has data available for cooperation mode transmission. Alternatively, the procedure is initiated when data for cooperation mode transmission becomes available. And the channel condition between the base station and the UE is worse than the first threshold value.

According to one method, a UE stops a procedure of finding a qualified cooperative UE when at least one of the following conditions is fulfilled: (1) channel condition between a base station and the UE is better than a second threshold value; or (2) no data for cooperation mode transmission is available. The procedure is stopped by stopping the transmission of a D2D discovery. Alternatively, the procedure is stopped when the channel condition between the base station and the UE becomes better than the second threshold value. Alternatively, the procedure is stopped when the UE has no more data for cooperation mode transmission. The UE transmits a notification to the base station when the UE stops the procedure. In one method, the notification notifies the base station that the UE doesn't want to find a qualified cooperative UE. The notification indicates that no qualified cooperative UE being found.

According to one method, a UE initiates a procedure of monitoring to find a qualified cooperative UE when the following conditions are fulfilled: (1) channel condition between a base station and a UE is worse than a third threshold value; and (2) the UE has data available for cooperation mode transmission. The procedure is initiated by transmitting a D2D discovery. Alternatively, the procedure is initiated when the channel condition between the base station and the UE becomes worse than the third threshold value, and the UE has data available for cooperation mode transmission. Alternatively, the procedure is initiated when data for cooperation mode transmission becomes available. And the channel condition between the base station and the UE is worse than the third threshold.

According to one method, a UE stops a procedure of monitoring to find a qualified cooperative UE when at least one of the following conditions is fulfilled: (1) channel condition between a base station and the UE is better than a fourth threshold value; or (2) no data for cooperation mode transmission is available. The procedure is stopped by stopping monitoring a D2D discovery. Alternatively, the procedure is stopped when channel condition between the base station and the UE becomes better than the fourth threshold. Alternatively, the procedure is stopped when the UE has no more data for cooperation mode transmission. The UE transmits a notification to the base station when the UE stops the procedure. In one method, the notification notifies the base station that the UE doesn't want to find a qualified cooperative UE. The notification indicates that no qualified cooperative UE being found.

In the various disclosed methods, data for cooperation mode transmission is referred to data that can be transmitted using cooperation mode. In the various disclosed methods, the cooperation mode is disabled. In the various disclosed methods, the UE is using individual mode for a transmission. In these methods, the threshold value (such as the first threshold value, the second threshold value, the third threshold value, or the fourth threshold value) is configured by the base station. An indication about which data is considered as data for cooperation mode transmission is configured by the base station. The channel condition between the base station and the UE is measured based on DL reference signal. The cooperation mode transmission is referred to an uplink transmission that is transmitted by more than one UE using the same time-frequency resource. The individual mode transmission is referred to an uplink transmission that is transmitted by one UE using a dedicated time-frequency resource assigned to the UE. A cooperative UE is referred to a UE receiving cooperative data for transmitting the cooperative data using cooperation mode.

D2D discovery, D2D response, and/or D2D measurement may be used to find a qualified cooperative UE. When receiving a D2D discovery, a UE may transmit a D2D response to a sender of the D2D discovery. The discovery and response can assist the sender of the D2D discovery to check whether the sender of the D2D response is a qualified cooperative UE. For example, a D2D channel measurement between the UEs may be the basis for whether the UE is a qualified cooperative UE. The D2D signaling is overhead of cooperation mode operation and should be used efficiently. Unnecessary D2D signaling should be avoided.

To use D2D signaling efficiently, a UE does not need to transmit a response to D2D discovery if the UE determines that it is not qualified to be a cooperative UE. Without transmitting the response, the D2D signaling overhead can be saved.

When receiving a D2D discovery, a UE may perform some check to decide whether to transmit a D2D response. The D2D discovery is for finding a qualified cooperative UE.

The check may include whether a sender of the D2D discovery connects to the same serving cell as the serving cell of the UE.

The check may include whether D2D channel condition between a sender of the D2D discovery and the UE is qualified, e.g. compared with a threshold. The threshold may be configured by a BS and can be used to check whether the UE fulfills D2D channel condition of a qualified cooperative UE. D2D channel condition may be measured based on D2D discovery message or reference signaling from a UE finding candidate cooperative UE.

The check may include whether DL channel condition of the UE is qualified, e.g. compared with a threshold. The threshold may be configured by a BS and can be used to check whether the UE fulfills DL channel condition of a qualified cooperative UE.

The check may be based on content of the D2D discovery message. The check may be based on resource of receiving the D2D discovery message.

According to one method, the method includes a first UE receiving a message from a second UE via D2D link. The first UE determines whether to transmit a response of the message via D2D link based on at least one or more of the following criteria: (1) whether the second UE connects to the same serving cell as the serving cell of the first UE; (2) whether D2D channel condition between the first UE and the second UE is qualified; or (3) whether DL channel condition of the first UE is qualified. The first UE doesn't transmit the response if the second UE doesn't connect to the same serving cell as the serving cell of the UE. The first UE doesn't transmit the response if D2D channel condition between the first UE and the second UE is not qualified. The first UE doesn't transmit the response if DL channel condition of the first UE is not qualified. The first UE transmits the response if the second UE connects to the same serving cell as the serving cell of the UE. The first UE transmits the response if D2D channel condition between the first UE and the second UE is qualified. The first UE transmits the response if DL channel condition of the first UE is qualified.

In one method, the first UE determines whether D2D channel condition is qualified by comparing the measured D2D channel condition with a first threshold. In one method, the first UE determines whether DL channel condition is qualified by comparing the measured DL channel condition with a second threshold. In the various methods, the threshold (such as the first threshold or the second threshold) is configured by the base station. In some methods, the D2D channel condition is measured by measuring the message. In some methods, the D2D channel condition is measured by measuring a D2D reference signal transmitted by the sender. In some methods, the DL channel condition is measured by measuring DL reference signal transmitted by the base station.

In one method, the first UE determines whether to transmit the response based on content of the message. In some methods, the message indicates the serving cell of the sender. The first UE determines whether to transmit the response based on resource of receiving the message. In some methods, the message is a D2D discovery message. The D2D discovery message is used to find a qualified cooperative UE. In the various methods, a cooperative UE is referred to a UE receiving cooperative data for transmitting the cooperative data using cooperation mode.

When cooperation mode is reconfigured or disabled, cooperative data may not have been successfully transmitted. The cooperative data may be retransmitted unexpectedly by the BS if proper handling is not done.

After an originating UE of cooperation mode transmission becomes invalid, a cooperative UE doesn't transmit cooperative data of the originating UE. The cooperative UE may flush the cooperative data from a buffer. The originating UE may become invalid due to being removed from configuration. The originating UE may become invalid due to not being detected anymore. The originating UE may become invalid due to D2D channel condition between the originating UE and the cooperative UE becoming bad. The cooperative UE may be reconfigured to remove the originating UE from a cooperation set. The cooperative UE may detect that D2D channel condition between the originating UE and the cooperative UE becomes bad.

After cooperation mode is disabled or deactivated, a UE doesn't transmit cooperative data received from other UE(s). The UE may flush the cooperative data from a buffer.

According to one method, a first UE performs a cooperation mode transmission. The first UE receives a configuration to disable or deactivate cooperation mode, and the first UE stops performing an uplink transmission for data received from a second UE. The first UE flushes the UE buffer of the data received from the second UE.

According to another method, a first UE performs a cooperation mode transmission. The first UE receives a configuration to remove a second UE from a set of UEs for cooperation mode transmission. The first UE stops performing an uplink transmission for data received from the second UE. The first UE flushes the UE buffer of the data received from the second UE. In the various methods, the set of UEs for cooperation mode transmission comprises one or more UEs whom the first UE may receive cooperative data from.

In another method, the first UE performs a cooperation mode transmission. The first UE detects that a second UE is becoming invalid. The first UE stops performing an uplink transmission for data received from the second UE. According to one method, the second UE becomes invalid due to being removed from configuration. In another method, the second UE becomes invalid because the first UE cannot detect the second UE. In another method, the second UE becomes invalid due to that D2D channel condition worsens between the first UE and the second UE.

In the various methods, the data transmitted using cooperation mode is referred to cooperative data. In the various methods, an originating UE is referred to a UE generating cooperative data for transmitting the cooperative data using cooperation mode. In the various methods, a cooperation mode transmission is referred to an uplink transmission that is transmitted by more than one UE using the same time-frequency resource.

To perform a cooperation mode transmission, an originating UE and cooperative UE(s) need to perform uplink transmission cooperatively. Uplink resource used to transmit cooperative data also needs to be known by the UEs. Moreover, the cooperative data may need to be distributed via D2D before it is transmitted in uplink cooperatively. The originating UE may need to acquire a D2D resource for transmitting the cooperative data, and the cooperative UE(s) may need to acquire D2D resources for receiving the cooperative data. In addition, cooperation mode transmission cannot be achieved if the originating UE and the cooperative UE(s) do not have the same understanding as to which resource is used to transmit which cooperative data. Resource coordination may be required when an originating UE and a cooperative UE acquires UL resource and/or D2D resource.

A method for an originating UE to acquire a D2D resource and an UL resource is that D2D resource and UL resource are allocated by a same signaling. The originating UE constructs a PDU for carrying cooperative data based on the allocated UL resource (UL grant). The originating UE uses the allocated D2D resource to distribute the PDU to other cooperative UE(s). The originating UE uses the allocated UL resource to transmit the PDU to the BS. The cooperative UE(s) transmits the PDU to BS using the same UL resource. The allocated UL resource and/or D2D resource indicates the time and frequency resource that is allocated to the UE.

A method for an originating UE to acquire a D2D resource and an UL resource is that the D2D resource is derived from UL resource (or the UL resource is derived from D2D resource). Since the size of D2D resource may be proportional to the size of the UL resource or the difference of the sizes between the D2D and UL resources are fixed, the originating UE may derive either the size of the UL or D2D resource based on receiving the size of one of the resources. Information to derive the D2D resource may be obtained by the allocated UL resource (UL grant). Information to derive UL resource may be obtained by the allocated D2D resource (D2D grant). For example, a signaling includes complete information of an UL grant but incomplete or no information specifically for a D2D resource. The originating UE derives the D2D resource based on the signaling. Another example is that a signaling includes complete information of a D2D grant but incomplete or no information specifically for a UL resource. The originating UE derives the UL resource based on the signaling.

A method for a cooperative UE to acquire a resource for receiving cooperative data is disclosed herein. In this method, the cooperative UE monitors a signaling of UL grant allocation from the BS to an originating UE. The UL grant may be used for D2D transmission. For example, the cooperative UE receives the UL transmission from the originating UE using the resource allocated by the UL grant. For the cooperative UE, this is like receiving a D2D transmission. For the originating UE, this is like performing a UL transmission. Alternatively, the UL grant may be used to derive a resource for D2D transmission. The cooperative UE may understand properties of the resource used by the originating UE to perform D2D transmission by monitoring the UL grant allocation from the BS to the originating UE. In this method, the cooperative UE needs to know how to receive the signaling of UL grant allocation from the BS to the originating UE. Necessary configurations such as, but not limited to, parameters to decode the signaling and to identify the target of the signaling, may be provided to the cooperative UE. The configuration may be provided in a message to enable cooperation mode. The UE identity of the originating UE may be provided by the BS to the cooperative UE. The UE identity may be used to monitor a signaling, such as the UL grant allocation, from the BS to the originating UE. The UE identity may be used to monitor cooperative data from the originating UE via the D2D link.

If the D2D resource is not used for distribution, the originating UE distributes the cooperative data based on the UL grant and related parameter(s) accordingly. The related parameter(s) may be specifically used for distribution and explicitly indicated by the BS. Alternatively, the related parameters may be the same as those used for uplink transmission, i.e. the originating UE performs uplink transmission which also achieves the purpose of distributing cooperative data to its cooperative UE(s). The power used to distribute the cooperative data could be the same as that used for finding cooperative UE(s), explicitly indicated by BS, or the same as that used for uplink transmission.

A method for a cooperative UE to acquire an UL resource for cooperation mode transmission is disclosed herein. In this method, the cooperative UE monitors a signaling of UL grant allocation from the BS to an originating UE. The cooperative UE can understand the UL resource for cooperation mode transmission by monitoring UL grant allocation from BS to the originating UE. In this method, the cooperative UE needs to know how to receive the signaling of UL grant allocation from the BS to the originating UE. Necessary configurations such as, but not limited to, parameters to decode the signaling and to identify the target of the signaling, may be provided to the cooperative UE. The configuration may be provided in a message to enable cooperation mode. The UE identity of the originating UE may be provided by the BS to the cooperative UE. The UE identity may be used to monitor a signaling, e.g. UL grant allocation, from the BS to the originating UE.

A method for a cooperative UE to acquire UL resource for cooperation mode transmission is also disclosed herein. In this method, the UL resource is derived from the D2D resource. Since the size of D2D resource may be proportional to the size of the UL resource or the difference in size of these two resources is fixed, the cooperative UE may derive the UL resource based on the D2D resource when cooperative data is received. The cooperative UE may start to use the uplink resource after the originating UE stops using the D2D resource to perform retransmission of the cooperative data.

If the originating UE uses an uplink resource to distribute cooperative data to a cooperative UE, the cooperative UE can directly know the uplink resource based on where the cooperative data is received. The cooperative UE may start to use the uplink resource at the timing to use the uplink resource to perform retransmission.

In some methods, assistance information may be provided from an originating UE to a cooperative UE via D2D transmission. The assistance information may assist the cooperative UE to perform an uplink transmission using cooperation mode.

In some methods, the assistance information may comprise an uplink grant. The uplink grant may be included in a same D2D transmission as cooperative data. The uplink grant indicates which uplink resource is used to transmit the cooperative data in uplink.

In some methods, the assistance information may include timing to perform an uplink transmission. The timing can be used to ensure the originating UE and cooperative UE(s) perform the uplink transmission at the same time. The timing may be indicated by timestamp, frame number, or the like.

The assistance information may assist the cooperative UE to encode the received cooperative data for performing uplink transmission, such as information for modulation, information for coding, information for redundancy version, or the like.

In some method, the cooperation mode transmission may refer to an uplink transmission using the cooperation mode. The uplink transmission using cooperation mode is transmitted by multiple UEs at the same time.

In the various methods disclosed herein, cooperative data may refer to the data to be transmitted by cooperation mode. An originating UE may refer to a UE generating cooperative data for the cooperation of an uplink transmission. A cooperative UE may refer to a UE receiving cooperative data for the cooperation of an uplink transmission.

According to one method, a first UE receives a signalling comprising a D2D resource allocation and a UL resource allocation. The first UE uses the D2D resource to transmit a cooperative data via D2D link, and the first UE uses the UL resource to transmit the cooperative data via uplink.

The first UE constructs a PDU for carrying the cooperative data based on the UL resource. In one method, the first UE uses the D2D resource to transmit the cooperative data to a second UE. In another method, the second UE uses the UL resource to transmit the cooperative data via uplink. The second UE uses the UL resource to transmit the cooperative data via uplink.

In another method, the first UE receives a signalling comprising a first resource allocation. The first UE derives a second resource at least based on the first resource allocation. In one method, the information to derive the second resource is obtained from the first resource allocation. The information is used to derive (1) timing of the second resource, (2) frequency of the second resource, (3) TB size for a transmission using the second resource, and/or (4) MCS for a transmission using the second resource.

The signalling comprises incomplete information specifically for the second resource. Alternatively, the signalling comprises no information specifically for the second resource.

The first resource is a D2D resource and the second resource is a UL resource. Alternatively, the first resource is a UL resource and the second resource is a D2D resource.

The D2D resource is used to transmit a cooperative data via D2D link. The UL resource is used to transmit the cooperative data via uplink.

According to another method, a second UE detects a signalling of a UL grant allocation from a BS to a first UE. The second UE receives a cooperative data from the first UE at least based on the signalling. The second UE receives the cooperative data using a resource allocated by the UL grant. Alternatively, the second UE receives the cooperative data using a resource derived by the UL grant.

Information to derive the resource is obtained from the UL grant. The information is used to derive (1) timing of the resource, (2) frequency of the resource, (3) TB size for a transmission and/or reception using the resource, and/or (4) MCS for a transmission and/or reception using the resource.

In these methods, the second UE understands a resource used by the first UE to perform a D2D transmission by monitoring the UL grant allocation from the BS to the first UE. The D2D transmission is used to transmit the cooperative data. The first UE transmits the cooperative data using the UL grant.

According to another method, a second UE detects a signalling of a UL grant allocation from a BS to a first UE. The second UE transmits a cooperative data to the BS at least based on the signalling. The cooperative data is received from the first UE. The second UE acquires UL resource for transmitting the cooperative data by monitoring the signalling of UL grant allocation from the BS to the first UE.

In the various methods, a parameter to decode the signalling is provided to the second UE from the BS. A parameter to identify a target of the signalling is provided to the second UE from the BS. A UE identity of the first UE is provided to the second UE from the BS. The parameter or the UE identity is provided in a message to enable cooperation mode.

In the various methods disclosed herein, the UE identity is used to monitor the signalling. The UE identity is used to monitor cooperative data from the first UE via D2D link.

Power used to transmit the cooperative data is explicitly indicated by the BS. Power used to transmit the cooperative data is the same as power used for an uplink transmission. Power used to transmit the cooperative data is the same as power used for finding a qualified cooperative UE.

According to another method, a second UE receives a signalling comprising a D2D resource allocation. The second UE derives a UL resource at least based on the D2D resource allocation.

Information to derive the UL resource is obtained from the D2D resource allocation. The information is used to derive (1) timing of the second resource, (2) frequency of the second resource, (3) TB size for a transmission using the second resource, and/or (4) MCS for a transmission using the second resource.

The signalling comprises incomplete information specifically for the second resource. Alternatively, the signaling comprises no information specifically for the second resource.

The second UE starts to use the UL resource after a first UE stops using the D2D resource to transmit a cooperative data. Alternatively, the second UE starts to use the UL resource at a timing to use the UL resource to perform retransmission.

In various methods, the D2D resource is used to receive a cooperative data from the first UE. In various methods, the UL resource is used to transmit the cooperative data via uplink.

According to one method, a first UE transmits information assisting cooperation mode transmission via a D2D transmission. In another method, a second UE receives the information assisting cooperation mode transmission via a D2D transmission. The second UE performs a cooperation mode transmission at least based on the information.

In one method, the information comprises an uplink grant. The information comprises a timing to perform an uplink transmission. The information comprises information assisting the second UE to encode the received cooperative data for performing uplink transmission. The information is used to modulate or encode the cooperative data.

The uplink grant is included with a cooperative data in the D2D transmission. The uplink grant indicates uplink resource to be used to transmit the cooperative data in uplink.

The timing is used to ensure the first UE and the second UE perform the uplink transmission at the same time. The timing is indicated by a timestamp. Alternatively, the timing is indicated by a frame number.

In some methods, the D2D resource indicates time and frequency resource to be used for a D2D transmission. In some methods, the UL resource indicates time and frequency resource to be used for an uplink transmission.

In the various methods, the first UE is an originating UE. The second UE is a cooperative UE. In the various methods, the cooperation mode transmission is an uplink transmission using cooperation mode. An uplink transmission using cooperation mode is transmitted by multiple UEs at the same time. For example, the first UE and the second UE transmit an uplink transmission using cooperation mode at the same time.

The originating UE generates cooperative data for the cooperation of an uplink transmission. The cooperative UE receives cooperative data for the cooperation of an uplink transmission. The cooperative data is data to be transmitted by cooperation mode.

Referring back to FIGS. 3 and 4, in one embodiment, the device 300 includes a program code 312 stored in memory 310. The CPU 308 could execute program code 312 to enable the UE (i) to receive an indication indicating a type of data that can be transmitted using a cooperation mode; (ii) to transmit a first data using the cooperation mode, wherein the first data belongs to the type of data using the cooperation mode based on the indication; (iii) to transmit a second data without using the cooperation mode, wherein the second data does not belong to the type of data using the cooperation mode based on the indication, and wherein the cooperation mode is enabled when transmitting the first data and the second data.

In another embodiment, the CPU 308 could execute program code 312 to enable the UE (i) to acquire an uplink (UL) resource and a device to device (D2D) resource from a base station (BS); (ii) to inform one or more cooperative UE (CUE) of the UL resource and the D2D resource available for use for cooperative data transmission; (iii) to transmit cooperative data to the one or more CUE via the D2D resource; and (iv) to transmit cooperative data using the UL resource in uplink.

In another embodiment, the CPU could further execute program code 312 to enable the UE to (i) acquire an UL resource from a BS; (ii) derive a D2D resource from the UL resource; (iii) inform one or more cooperative UE of the UL resource and the D2D resource available for use for cooperative data transmission; (iv) transmit cooperative data to the one or more cooperative UE via the D2D resource; and (v) transmit cooperative data using the UL resource in uplink.

In another embodiment, the CPU could further execute program code 312 to enable the UE to (i) receive a signalling comprising a D2D resource allocation and a UL resource allocation; (ii) use the D2D resource to transmit a cooperative data via D2D link; and (iii) use the UL resource to transmit the cooperative data via uplink.

Furthermore, the CPU 308 can execute the program code 312 to perform all of the above-described actions and steps or others methods described herein.

Based on the invention, a base station can properly provide configuration to a set of UEs to receive downlink transmission for instruction from factory network.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of user equipment (UE) for improving uplink transmission, the method comprising:
   receiving an indication indicating a type of data that can be transmitted using a cooperation mode, wherein the cooperation mode enables user equipments (UEs) to exchange their uplink data by collaborating and steering transmit signals towards a base station to improve signal-to-noise ratio (SNR) at the base station, wherein the indication is used to avoid using the cooperation mode to transmit data not suitable for transmission using the cooperation mode, and wherein the indication indicates data from which radio bearer(s) is transmitted using the cooperation mode;
   transmitting a first data using the cooperation mode if the first data is the type of data that, as the indication indicates, be transmitted using the cooperation mode; and
   transmitting a second data without using the cooperation mode even though the cooperation mode is enabled if the second data is not type of data that, as the indication indicates, is transmitted using the cooperation mode;
   wherein data transmitted using the cooperation mode is transmitted by more than one UE using a same time-frequency resource.

2. The method of claim 1, a transmission without using the cooperation mode is using an individual mode.

3. The method of claim 2, data transmitted using the individual mode is transmitted by one UE using a dedicated time-frequency resource assigned to the UE.

4. The method of claim 1, the UE determines whether to initiate finding a qualified cooperative UE at least based on the indication.

5. The method of claim 4, the cooperative UE is an UE receiving the first data and transmitting the first data using the cooperation mode.

6. The method of claim 1, the UE is an originating UE who generates the first data to be transmitted using the cooperation mode.

7. The method of claim 1, the indication is included in a configuration from a base station to the UE.

8. The method of claim 7, the configuration is used to enable the cooperation mode of the UE.

9. A User Equipment (UE) for improving uplink transmission comprising:
   a control circuit;
   a processor installed in the control circuit;
   a memory installed in the control circuit and coupled to the processor;
   wherein the processor is configured to execute a program code stored in the memory to:
      receive an indication indicating a type of data that can be transmitted using a cooperation mode, wherein the cooperation mode enables user equipments (UEs) to exchange their uplink data by collaborating and steering transmit signals towards a base station to improve signal-to-noise ratio (SNR) at the base station, wherein the indication is used to avoid using the cooperation mode to transmit data not suitable for transmission using the cooperation mode, and wherein the indication indicates data from which radio bearer(s) is transmitted using the cooperation mode;
      transmit a first data using the cooperation mode if the first data is the type of data that, as the indication indicates, be transmitted using the cooperation mode; and
      transmit a second data without using the cooperation mode even though the cooperation mode is enabled if the second data is not type of data that, as the indication indicates, is transmitted using the cooperation mode;
      wherein data transmitted using the cooperation mode is transmitted by more than one UE using a same time-frequency resource.

10. The UE of claim 9, a transmission without using the cooperation mode is using an individual mode.

11. The UE of claim 10, data transmitted using the individual mode is transmitted by one UE using a dedicated time-frequency resource assigned to the UE.

12. The UE of claim 9, the UE determines whether to initiate finding a qualified cooperative UE at least based on the indication.

13. The UE of claim 12, the cooperative UE is an UE receiving the first data and transmitting the first data using the cooperation mode.

14. The UE of claim 9, the UE is an originating UE who generates the first data to be transmitted using the cooperation mode.

15. The UE of claim 9, the indication is included in a configuration from a base station to the UE.

16. The UE of claim 15, the configuration is used to enable the cooperation mode of the UE.

* * * * *